United States Patent [19]

Skarvada

[11] 4,409,664
[45] * Oct. 11, 1983

[54] DIGITAL WHEEL SPEED SENSOR

[75] Inventor: Thomas Skarvada, Woodland Hills, Calif.

[73] Assignee: Crane Co., Chicago, Ill.

[*] Notice: The portion of the term of this patent subsequent to May 26, 1998 has been disclaimed.

[21] Appl. No.: 240,902

[22] Filed: Mar. 5, 1981

Related U.S. Application Data

[62] Division of Ser. No. 80,123, Sep. 27, 1979, Pat. No. 4,270,176.

[51] Int. Cl.³ .................... G06F 15/20; B60T 8/00
[52] U.S. Cl. .................................... 364/565; 364/426; 303/103; 324/160
[58] Field of Search .................. 364/565, 569, 426; 303/91, 20, 103, 105, 106; 361/236, 240; 324/160, 161, 163, 166; 235/92 FQ, 92 TF

[56] References Cited

U.S. PATENT DOCUMENTS

| | | | |
|---|---|---|---|
| 3,757,167 | 9/1973 | Yoshikawa et al. | 324/160 |
| 3,922,534 | 11/1975 | Gerstenmeier et al. | 364/565 |
| 4,072,364 | 2/1978 | Gudat et al. | 324/160 |
| 4,125,295 | 11/1978 | Ruhnau et al. | 364/565 |
| 4,166,976 | 9/1979 | Ruhnau et al. | 364/565 |
| 4,179,656 | 12/1979 | Wagner | 364/565 |
| 4,184,203 | 1/1980 | Skarvada | 364/565 |
| 4,270,176 | 5/1981 | Skarvada | 364/426 |

Primary Examiner—Gary Chin
Attorney, Agent, or Firm—Hume, Clement, Brinks, Willian & Olds, Ltd.

[57] ABSTRACT

An apparatus for precisely measuring the period of a wheel signal generated by a transducer in a brake control system includes a clock for generating a periodic clock signal, a first counter for maintaining a count of clock signal cycles, a second counter for maintaining a count of wheel signal cycles, a gate for selectively enabling and disabling the first and second counters at substantially the same phase angle of the wheel signal, and a computer programmed to read the first and second counters, to control the gate to enable the first and second counters for a period of time, and then to read the first and second counters again to arrive at measure of the elapsed time and the number of wheel signal cycles occurring during the measurement period.

10 Claims, 9 Drawing Figures

DIGITAL WHEEL SPEED SENSOR

This application is a division of application Ser. No. 080,123, filed Sept. 27, 1979, now U.S. Pat. No. 4,270,176.

BACKGROUND OF THE INVENTION

The present invention relates to a wheelspeed sensing system for use in a brake control system and more particularly to a means for digitally measuring the period of a periodic signal having a period related to wheelspeed.

One important class of modern brake control systems monitors the rotation of one or more wheels and modifies the braking force applied to the wheel as necessary for proper braking. Such brake control systems are in widespread use in commercial and military aircraft, and are in growing use in business aircraft and ground transportation vehicles. In use, these systems provide improved braking control and reduced stopping distances, and as such, they are important safety components of many modern vehicles.

One of the central elements of this type of brake control system is the wheelspeed transducer and associated circuitry. An accurate measure of wheelspeed is an important first step in detecting and then controlling braking conditions such as wheel skid. In the past, many brake control systems have relied on analog circuits to generate an analog parameter representative of wheelspeed. For example, one approach used in the past has been to process the periodic output signal of a wheelspeed transducer to generate a series of impulse signals which correspond in frequency with the periodic signal produced by the transducer. The impulse signals are then applied to an electrical charge integrator, such as a capacitor, and the voltage on the capacitor is used as a measure of wheel velocity.

The prior art analog approach exhibits certain limitations and drawbacks. In that the impulse signals are integrated, multiple periods of the transducer signal are often required to accurately indicate changing wheelspeed. Furthermore, this approach utilizes analog circuits which are subject to inaccuracies due to drift under certain circumstances. Moreover, these analog approaches are not well suited for use with brake control systems employing digital processors. The analog wheelspeed value must be digitized before it can be input into a digital processor, and the time delays required for precision analog to digital conversion can be a drawback in some applications.

SUMMARY OF THE INVENTION

The present invention is directed to an improved wheel speed sensing system for use with brake control systems. This wheel speed sensing system avoids many of these and other drawbacks of the prior art by employing digital timing techniques to digitally measure the period of a signal having a period related to wheelspeed. By measuring this period, information is obtained regarding wheelspeed, which is proportional to the inverse of the measured period. As used herein, the term "wheelspeed" is sometimes used to refer to a measure of the period of a signal having a frequency related to wheelspeed.

The wheel speed sensing system of this invention includes means for generating a substantially periodic signal having a frequency related to wheelspeed. This periodic signal is processed to generate a series of digital signals having a period related to that of the periodic signal, which digital signals are supplied as inputs to a counting means. Clock means are provided for generating a series of clock signals which are also supplied as inputs to the counting means. The counting means operates to count the number of clock signals which are generated between a pair of digital signals, and thereby to measure the elapsed time separating the pair of digital signals. In this way a digital measure of the period of the original periodic signal is obtained.

A preferred embodiment of this wheel speed sensor includes means for selecting the number of intervening digital signals falling between the timed pair of digital signals in order to maintain the measured elapsed time within a preferred range as the wheel speed varies. For example, one preferred embodiment includes means for automatically selecting the number of intervening digital signals to ensure that the time resolution of the measurement exceeds a certain minimum value. In this way, more nearly uniform time resolution and response time are achieved automatically over a wide range of wheel speeds.

Another form of the present invention further includes a gating means for selectively enabling and disabling the counter means at a predetermined phase angle of the periodic signal. A preferred embodiment of this form of the invention utilizes a computer to control the gating means via a control signal. When the control signal is present, the gating means operates to enable the counting means at the next occurrence of a preselected phase angle of the periodic signal. Similarly, when the control signal is absent, the gating means operates to disable the counting means at the next occurrence of the preselected phase angle of the periodic signal. Preferably, means are also provided for counting the cycles of the periodic signal during the time when the counting means is enabled.

The wheel speed sensor of this invention provides several important advantages over sensors of the prior art. Very short response times can be achieved, for only one period of the periodic output of the wheel speed transducer is required to complete a measurement cycle, and no multiple period integration is required. Furthermore, more of the circuit components of this wheel speed sensor are digital circuits and are, therefore, relatively reliable, stable, and compact. In fact, the functions of the counting means can be performed in large part by a general purpose digital processor such as a microprocessor, which can also be used to perform other functions in the brake control system. The output of this wheel speed sensor is a digital value representative of wheel speed or period which is suitable for further digital processing. The only analog to digital conversions which are required are simple 1 bit conversions which can be performed quickly, reliably, and simply.

Furthermore, the gating means of this invention provides a highly accurate measure of signal period, because it eliminates inaccuracies caused by variations in computer interrupt request response times. This gating means also minimizes the amount of computer time required to measure signal period.

These and other objects and attendant advantages of the present invention will be better understood by reference to the following detailed description taken in connection with the appended drawings.

DETAILED DESCRIPTION OF PREFERRED EMBODIMENTS

First Preferred Embodiment

Figure 1:
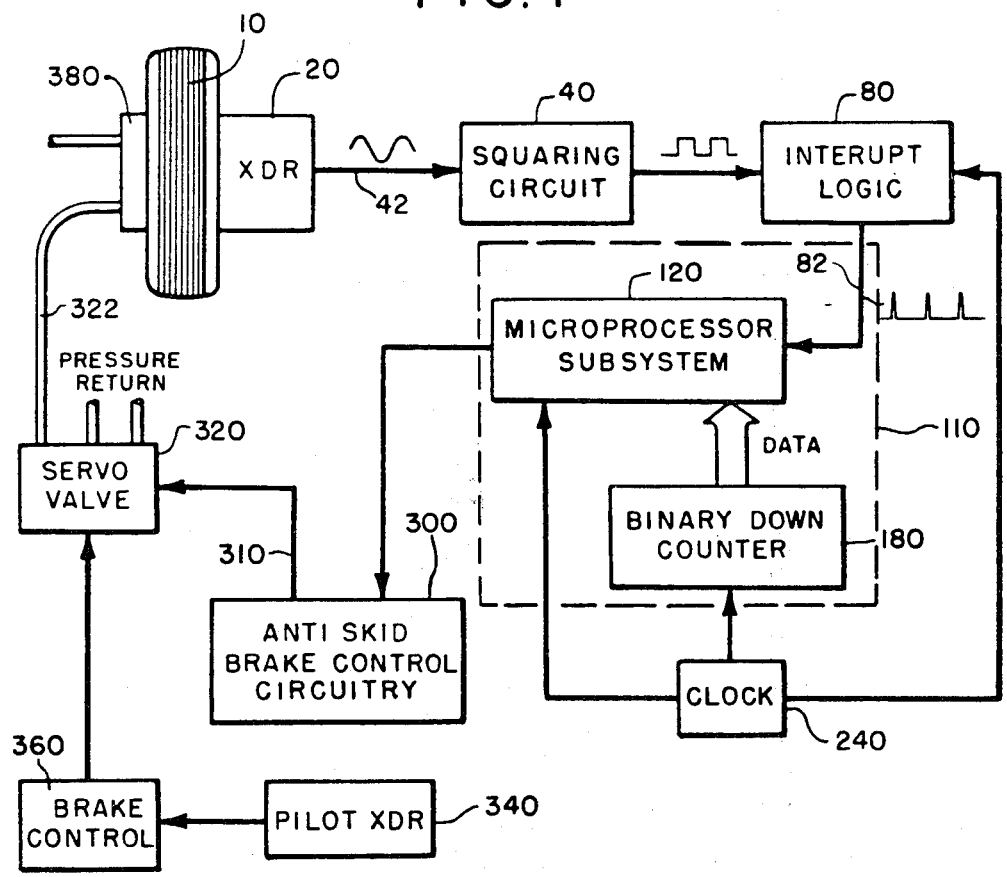
FIG. 1 is a block diagram of a brake control system including a first preferred embodiment of the wheel speed sensing system of this invention.

Referring now to the drawings, FIG. 1 shows a schematic representation of a brake control system employing a first preferred embodiment of the digital wheel speed sensor of this invention. By way of example, the described brake control system is an antiskid system. It should be understood, however, that the present invention is suitable for use with other brake control systems as well, for example, automatic braking systems. The system of FIG. 1 will first be described in general terms, and then individual components of the system will be described in greater detail.

The braking system of FIG. 1 is a closed loop system in which wheel speed is measured and supplied as an input to antiskid brake control circuitry which in turn alters the braking force applied to the wheel to substantially prevent wheel skidding. The wheel 10 is provided with a wheel speed transducer 20 which supplies a periodic, substantially sinusoidal signal having a frequency proportional to wheelspeed on line 42. This sinusoidal signal is applied to a squaring circuit 40 which generates a square wave having a period equal to that of the sinusoidal output of the transducer 20. This square wave is in turn applied to an interrupt logic circuit 80 which generates a digital signal such as an impulse signal at each positive transition of the square wave above a threshold level. These impulses are then applied via line 82 as interrupt signals to a counting means 110 which includes a microprocessor subsystem 120. This microprocessor 120 is connected to a binary down counter 180 which counts the clock signals generated by a clock 240, which also serves as the microprocessor clock in this embodiment. As will be described below in detail, the microprocessor 120 is programmed to respond to an interrupt from the interrupt logic 80 by reading the counter value stored in the binary down counter 180 at the time of such interrupt.

The elapsed time between two selected interrupt signals is then calculated as the difference between the counter values associated with the two interrupt signals. This elapsed time is proportional to the inverse of the wheelspeed and, after appropriate scaling, is supplied as an input to the antiskid brake control circuitry 300, where it is used in combination with wheelspeed measurements of other wheels and other factors to detect skid conditions and to generate an output signal on line 310 which modulates the brake pressure passed by a servo valve 320 under direction of the pilot via the pilot transducer 340 and the brake control 360. The modulated pressure is supplied via hydraulic line 322 to the brake 380 to supply braking torque to the wheel 10. Though the antiskid brake control circuitry 300 has been shown as a separate block from the microprocessor subsystem 120, it should be understood that it will often be desirable to perform many operations in the microprocessor subsystem 120 which have in the past been performed in analog antiskid brake control circuitry.

Figure 2:
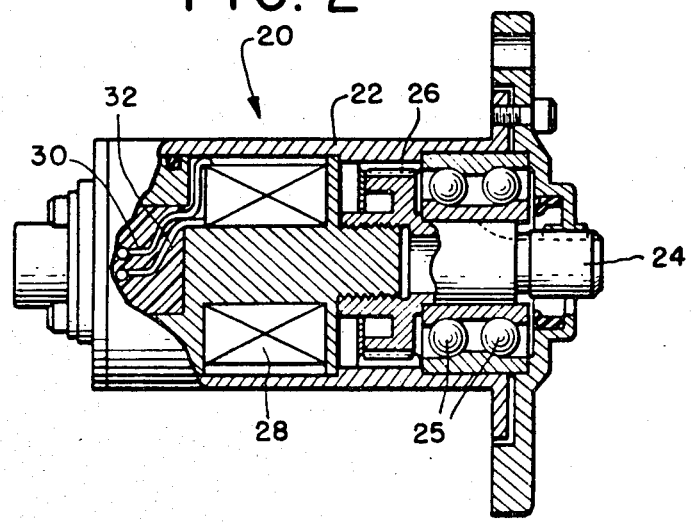
FIG. 2 is a cross-sectional view of the wheel speed transducer of FIG. 1.

Proceeding on to a more detailed description of the major components of this embodiment of the invention, the wheelspeed transducer 20 is shown in greater detail in FIG. 2. There it can be seen that the transducer 20 includes a nonrotating frame 22 which is mounted on a portion of the landing strut (non shown). A rotatable spindle 24 is supported on bearings 25 and is coupled to the wheel 10 so as to rotate with an angular velocity equal to that of the wheel. The spindle 24 includes a regular array of teeth 26. The frame 22 includes a coil 28 with two output leads 30,32.

This transducer 20 is a variable reluctance device which functions in a well known manner to generate a substantially sinusoidal output signal having a frequency proportional to wheelspeed. The relationship between the frequency of the output signal and wheelspeed is a function of the number and spacing of the teeth 26, which should be chosen to provide an output signal having the desired frequency range for the wheel speeds of interest. It has been found that the frequency of the transducer output should preferably remain in the range of about 20 Hz through 4000 Hz for many applications, and the configuration of the teeth 26 should be chosen accordingly for any particular application.

Figure 3:
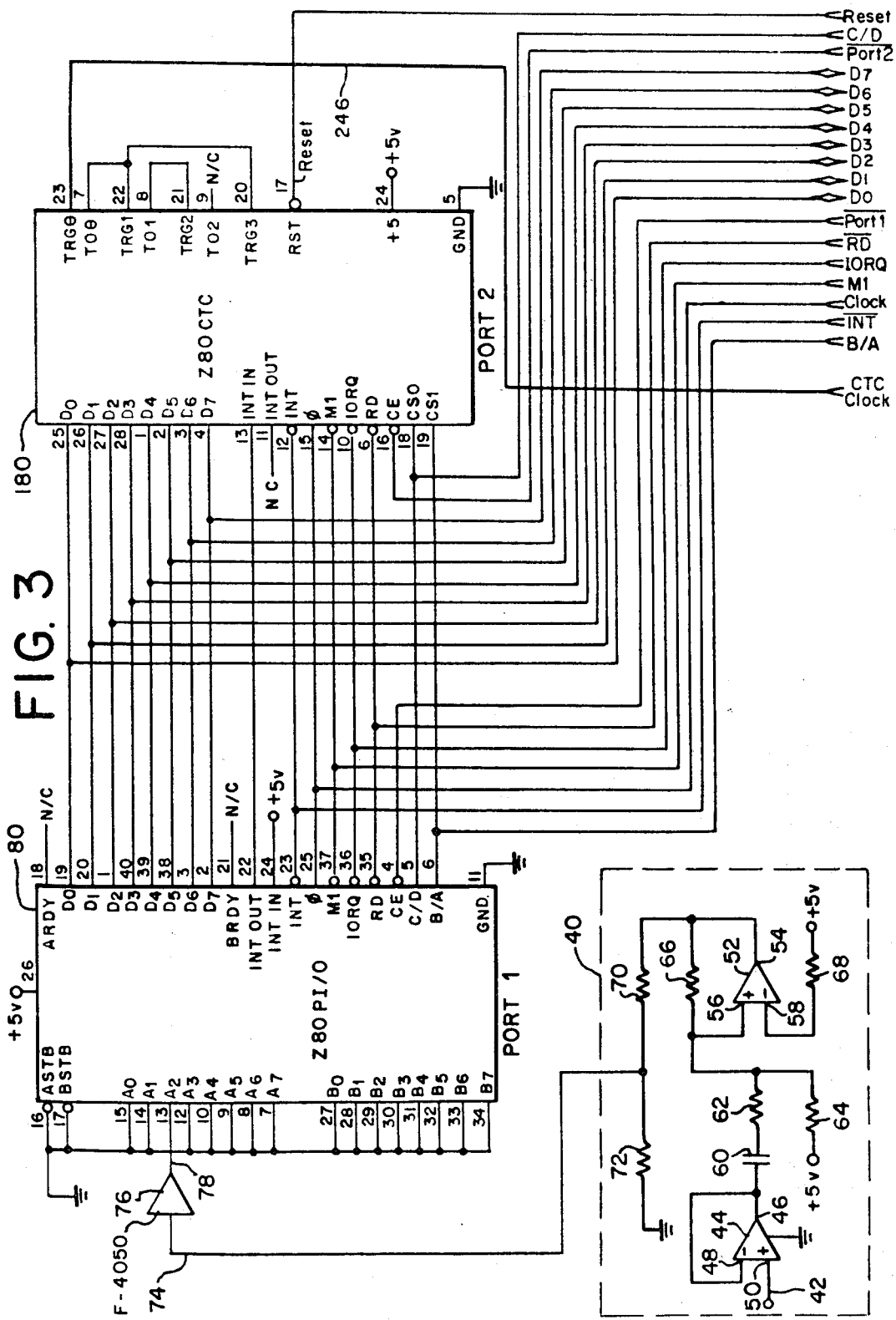
FIG. 3 is a schematic diagram of the squaring circuit, the interrupt logic, and the binary down counter of FIG. 1.
Figure 3A:
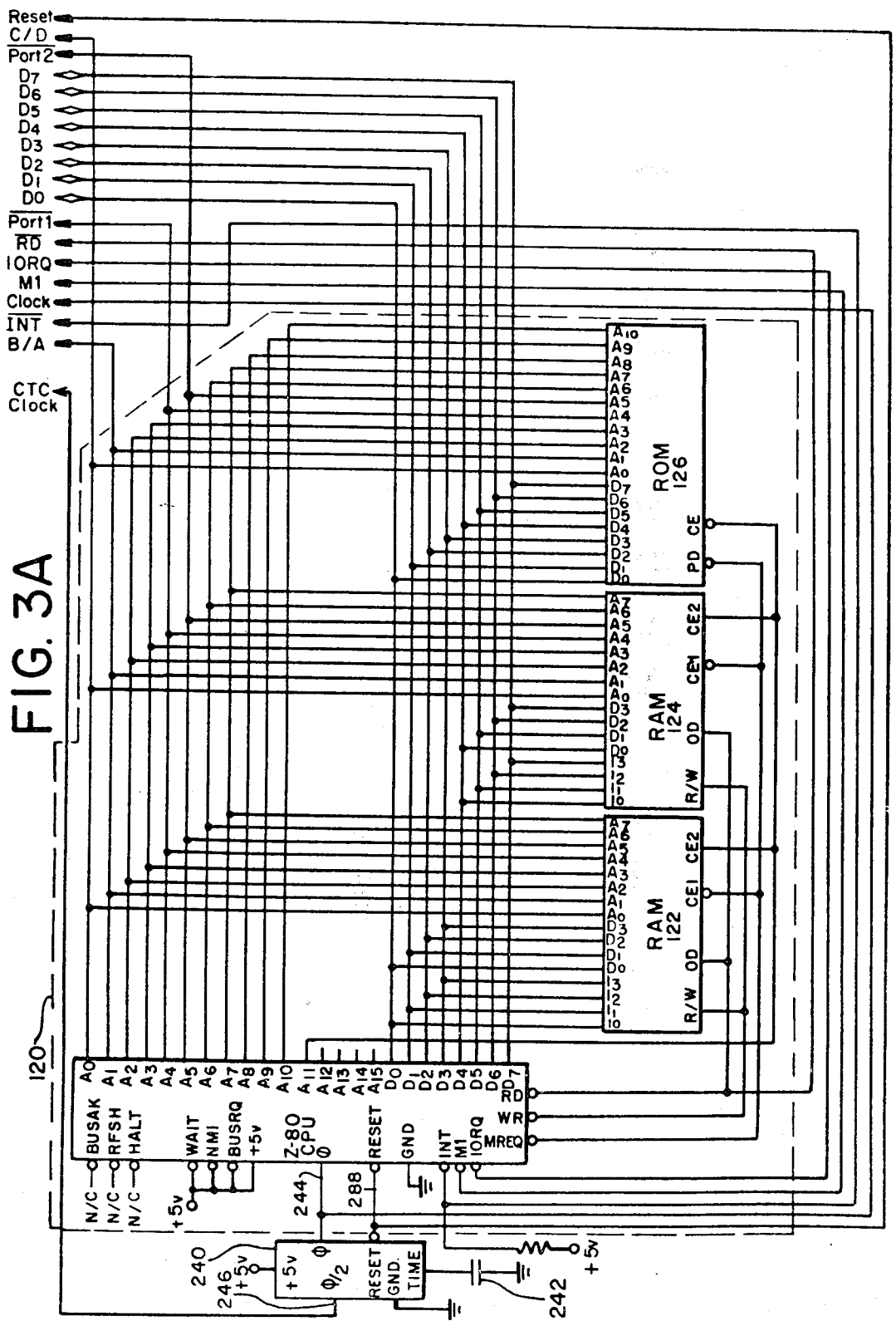
FIG. 3a is a schematic diagram of the microprocessor subsystem of FIG. 1.
Figure 3B:
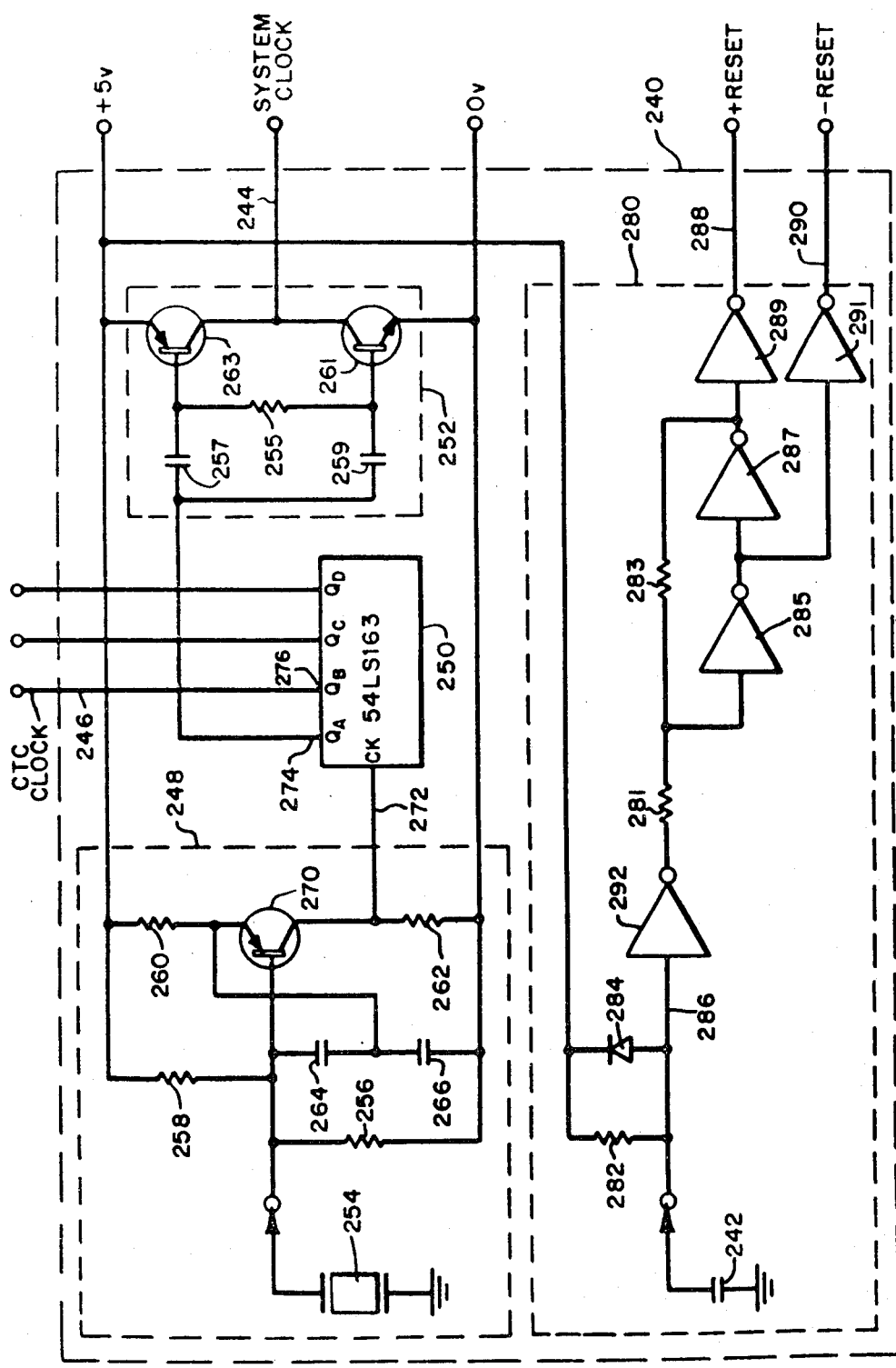
FIG. 3b is a schematic diagram of the clock of FIG. 1.

FIGS. 3, 3a, and 3b together form a detailed schematic drawing of the squaring circuit 40, interrupt logic 80, microprocessor subsystem 120, binary down counter 180, and clock 240 of FIG. 1. These component circuits will be first identified and briefly described, and then the interconnection between the component circuits, the program, and the operation of this embodiment will be described in detail.

The squaring circuit 40 receives the sinusoidal output of the transducer 20 on conductor 42 and supplies a square wave output on conductor 78 having a period equal to that of the input signal. The squaring circuit includes two operational amplifiers 44,52 each having an output 46,54 and a set of differential inputs 48,50 and 56,58, respectively. The signal on conductor 42 is applied to the positive input 50 of the amplifier 44. The output 46 of the amplifier 44 is connected directly to the negative input 48 so that the amplifier 44 functions as a voltage follower. The output of the amplifier 44 is also passed via the capacitor 60 and the resistor 62 to the positive input 56 of the amplifier 52. This input 56 is also connected via the resistor 64 to a 5-volt power supply. The negative input 58 is connected via the resistor 68 to the 5-volt power supply, and the output terminal 54 is connected via the resistor 66 to the positive input 56. This output 54 is also connected via the series resistors 70,72 to ground as shown. A buffer 76 reduces transition times of the signal at the node between the resistors 70,72 and supplies the square wave output signal on the conductor 78. The amplifier 52 is used as a comparator with hysteresis to transform the sinusoidal output of the amplifier 44 to a square wave.

In this preferred embodiment the following components and values are used: National Semiconductor LM-124 Low Power Operational Amplifier (44,52); Fairchild CMOS F 4050/34050 Non Inverting Buffer (76); 10 K ohm resistors (62,64,68); 1 M ohm resistor (66); 27 K ohm resistor (70); 5.90 K ohm resistor (72); 1 micro farad capacitor (60).

The interrupt logic 80 is made up of a Z80-PIO interface circuit. This circuit is manufactured and sold by Zilog, Inc., 10460 Bubb Rd., Cupertino, Calif. 95014, and is described in detail in the Z80-PIO Technical Manual, copyrighted 1977 by Zilog, Inc. This Technical Manual, which is hereby incorporated by reference, should be consulted for a detailed description of the use and operating characteristics of the Z80-PIO. Here it is sufficient to state that the Z80-PIO, when programmed as described below, operates to generate an interrupt signal at each positive transition of the square wave signal applied to terminal 13 ($A_2$) of the Z80-PIO via line 78. The INTIN and INTOUT terminals of the Z80-PIO are arranged so that the series of interrupts generated in response to the square wave signal on pin 13 are high priority interrupts which will be promptly and consistently serviced with a minimum delay. In this embodiment the remaining Input/Output terminals of the Z80-PIO ($A_0$–$A_1$, $A_3$–$A_7$, $B_0$–$B_7$) are grounded, and the control and data terminals of the Z80-PIO are connected to the Z80-CPU in the conventional manner as described in the Technical Manual identified above. Also, terminal B/A is connected to address bus line $A_1$; terminal C/D is connected to address bus line $A_0$; and terminal C/E is connected to address bus line $A_5$.

The clock 240, shown in FIG. 3a and in greater detail in FIG. 3b, provides synchronizing signals to each of the digital circuits as well as clock signals to the binary down counter 180. In this embodiment the clock 240 supplies two clock signals: a system clock signal on terminal 244, and a counter clock signal on terminal 246. This clock 240 is made up of three major components: an oscillator circuit 248 designed to oscillate at 5 megahertz, a binary counter 250, and an output stage 252.

The oscillator circuit 248 is a well-known Colpitts type oscillator and thus will not be described in any great detail here. This circuit includes a 5 megahertz piezoelectric quartz crystal 254 which cooperates with the resistors 256–262, the capacitors 264,266, and the transistor 270 to produce a periodic 5.00 megahertz signal on the conductor 272.

The 5.00 megahertz signal on conductor 272 is supplied as a clock input to the binary counter 250 which produces a periodic 2.50 megahertz square wave signal on output terminal 274 and a periodic 1.25 megahertz square wave signal on output terminal 276. The 1.25 megahertz signal is supplied via conductor 246 as a clocking signal to the binary down counter 180. The 2.50 megahertz signal is amplified and shaped by the output stage 252 and is supplied via conductor 244 as a system clock to the microprocessor subsystem 120 and the binary down counter 180, and the interrupt logic 80.

The clock 240 also includes a reset circuit 280 which generates a reset pulse when power is first applied to the system. This reset pulse is applied to the microprocessor subsystem 120 and the binary down counter 180 to ensure proper system startup. The reset circuit 280 includes a capacitor 242 which is connected on one side via a resistor 282 and a diode 284 to the system 5 volt line and on the ohter side to ground. The capacitor rapidly discharges through the diode 284 when power is removed from the system. Thus, when power is restored, the voltage on the capacitor 242 and the line 286 is low. The reset circuit 280 also includes 5 inverting buffers such as CMOS 4049 integrated circuits which process the signal on line 286 to generate complementary outputs on terminals 288 and 290.

When power is initially applied to the reset circuit, the capacitor 242 is discharged and low and high outputs are generated on terminals 288 and 290, respectively. This condition is maintained until the capacitor 242 is charged to a voltage such that the threshold of the inverting buffer 292 is crossed. At this point the voltage on line 288 goes high and the voltage on line 290 goes low. Thus, a distinctive reset pulse is generated on lines 288 and 290 when power is spplied to the system. In this embodiment the value of the resistor 282 is 100 K ohms and the capacitor 242 is 1 micro farad to produce a reset pulse lasting somewhat less than 100 milliseconds.

The following components and values are used in the preferred embodiment of FIG. 3b; Standard Crystal Corp. 5.000 megahertz 800 A 32 PJ quartz crystal (254); 27 K ohms resistors (256,258,255,283); 300 ohm resistor (262); 510 ohm resistor (260); 18 picofarad capacitor (264); 68 picofarad capacitor (266,257,259); 2 N 3906 transistor (270,263); 2 N 3904 transistor (261); 2 K ohm resistor (281). In this embodiment the counter 250 is a TTL integrated circuit (54 LS 163).

The binary down counter 180 includes a Z80-CTC programmable counter circuit. This circuit is manufactured and sold by Zilog, Inc., and is described in the Z80-CTC Product Specification dated October, 1977, copyrighted 1977 by Zilog, Inc. This Product Specification is incorporated by reference herein and should be consulted for a detailed description of the use and operating characteristics of the Z80-CTC. When programmed and connected as described below, the Z80-CTC operates as a 16 bit binary down counter which counts down from FFFF (hexadecimal) to zero and then automatically resets to FFFF. The contents of the 16 bit counter can be read at any time by the microprocessor as two separate bytes via data bus lines $D_0$–$D_7$.

The 1.25 megahertz output of the clock 240 is applied to the Trigger/Clock Input (TRG$\frac{1}{4}$) for the Channel 0 counter in the Z80-CTC, where it causes the Channel 0 counter to be decremented at the rate of once every 800 nanoseconds. The Channel 0 Zero Count Terminal (TO$\theta$) is connected to the Trigger Clock Input (TRG1) for Channel 1 such that the Channel 1 counter is decremented each time the Channel 0 counter is decremented to zero. The counters for both Channels 0 and 1 are automatically reset to FF (hexadecimal) immediately following decrementing to zero.

The control terminals of the Z80-CTC are connected in the usual manner with $D_0$–$D_7$ connected to the data bus lines $D_0$–$D_7$. Furthermore, terminal CE is connected to address bus line $A_6$; terminal CS$\emptyset$ is connected to address bus line $A_0$; and terminal CS1 is connected to address bus line $A_1$.

The microprocessor subsystem 120 includes a Z80 -CPU, two Random Access Memory Chips 122,124, and a Read Only Memory Chip 126. The Z80-CPU and the three memory chips are interconnected in the conventional manner, as shown, and the Z80-CPU is strobed by a clock 240. The Z80-CPU is manufactured by Zilog, Inc., and is described in the Z80-CPU Technical Manual (copyrighted 1977 by Zilog, Inc.) and the Z80-CPU Product Specification dated March, 1978 (copyrighted 1977 by Zilog, Inc.), both of which are incorporated by reference herein.

The interconnections between the Z80-CPU and the Z80-CTC and the Z80-PIO have been described above. In addition to the standard connections to the clock 240 and memory chips 122,124,126, three input terminals of the Z80-CPU are tied high (WAIT, NMI, BUSRQ) and three input terminals are not connected (BUSAK, RFSH, and HALT).

The Z80-CPU can be programmed to execute a variety of tasks in measuring wheelspeed and determining proper brake pressure to avoid wheelskids; however, only two of these tasks are important to an understanding of this preferred embodiment. The first of these tasks is setting up the programmable features of the Z80-PIO and the Z80-CTC. In this embodiment this task is performed in a subroutine entitled SETUP. The second task is to measure the number of clock pulses separating a selected pair of interrupt signals. This task is performed in a subroutine entitled WHEELSP.

A program listing and a flow chart for SETUP are presented in Tables I and II, respectively, which describe in comprehensive detail the operations needed to properly program the Z80-PIO and the Z80-CTC. The program instructions used in Tables I, III and V are described in detail in the Z80-CPU Technical Manual. Briefly stated the SETUP subroutine operates to program Channel A of the Z80-PIO to MODE 3, with all port data bus lines as inputs, the interrupt vector set to the lower byte of the address of the WHEELSP subroutine, the interrupt enabled so that an interrupt request is generated only when bit 2 goes high. Thus, an interrupt request is generated at every positive transition of the signal on terminal $A_2$. Channel B of the Z80-PIO is programmed to MODE 3, with all port data bus lines as inputs, the interrupt vector set to a safe address, and the interrupt disabled.

The SETUP subroutine also operates to program both Channels 0 and 1 of the Z80-CTC to the counter mode, with the interrupt disabled, to decrement on a positive edge. Channel 0 is programmed to resume operation after loading a time constant and Channel 1 is programmed to continue counting. Both Channels 0 and 1 are programmed to reset to FF (hexadecimal) after decrementing to zero. The Z80-CTC interrupt vector is set to a safe address.

The second subroutine important to an understanding of this embodiment is the WHEELSP subroutine, which is listed in Table III and flowcharted in Table IV. This subroutine is automatically executed whenever an interrupt request signal is generated by Channel A of the Z80-PIO, that is, at each positive transition of the square wave output of the squaring circuit 40 the Z80-CPU is interrupted from its current activity and the WHEELSP subroutine is entered.

The program listing should be consulted for a detailed understanding of the operation of WHEELSP. In brief, this subroutine reads the contents of the Channel 0 and Channel 1 counters of the Z80-CTC at each interrupt. Together these two counters form a 16 bit counter which measures time in 800 nanosecond intervals. The difference between any two 16 bit counter readings is a measure of the elapsed time between the two readings, and consequently, between the two interrupts.

Of course, care should be taken to ensure that at least one interrupt is generated and that the counter is read at least once in every cycle of the 16 bit counter. Otherwise, erroneous readings may result. In this embodiment the cycle time of the counter is somewhat greater than 50 milliseconds. ($0.8 \times 10^{-6}$ sec. multiplied by 65.536 is greater than 52 milliseconds.) This sets the lower limit of operation of this embodiment at about 20 hertz, and the transducer 20 should be designed accordingly. Of course, other embodiments of the counter 180 may incorporate a greater or lesser number of bits and the clock 240 may be chosen to provide a faster or slower clock rate in order to accommodate transducer signals having other frequency ranges.

The WHEELSP subroutine of Table III utilizes a variable, TEETH, to determine the interval at which the counter is read. After each counter reading, the variable STATUS is set equal to TEETH. Then, at each successive interrupt, STATUS is decremented, and the counter is next read only after STATUS is decremented to zero. Thus, if TEETH is equal to 4, as in the listing of Table III, the counter will be read only at every fourth interrupt. That is, three intervening interrupt signals will separate the pair of interrupt signals at which the counter is read. By adjusting the value of TEETH the time resolution of the time interval, that is, the approximate number of clock pulses in the measured time interval, can be adjusted for a particular frequency transducer signal. The value of TEETH affects the frequency range of the wheel speed sensor. For example, with TEETH equal to 4 the lower limit on transducer frequency is about 80 hertz.

Another feature of WHEELSP is that the counter is read as two successive 8 bit bytes and that the 16 bit reading is compensated for the time delay in reading the second byte. This compensation is needed to correct for possible reading errors resulting from the delay in reading the second byte. For example, if the low order byte is equal to 01 when read, it will have been decremented to zero and have triggered a decrement in the high order byte before the high order byte is read by the Z80-CPU. In order to ensure accuracy, the 16 bit reading is arithmetically compensated for the delay in reading the second byte.

The compensated reading is then subtracted from the previous compensated reading to arrive at a difference integer representative of the period of the transducer signal. This difference is stored as the variable WHLSPD and the newly measured compensated reading is stored for use in calculating the next time interval. Finally, a flag is set indicating that new wheel speed information is available.

Thus, the sensor of this embodiment supplies two data variables: WHLSPD indicating the time difference between the two counter readings, and TEETH indicating the number of transducer cycle periods occurring between the two counter readings. Further processing can use the variables WHLSPD, TEETH, and appropriate scaling constants to arrive at a measure of the period of the transducer signal. Wheel velocity is proportional to the inverse of this period. Such further processing is outside the scope of this invention and will not be described in detail here.

Tables V and VI present the program listing and flow chart for an alternate embodiment of the WHEELSP subroutine, one which automatically alters the frequency at which the counter is read in order to control the time resolution of the measurement. This alternate embodiment of Tables V and VI is similar to the embodiment of Tables III and IV, and the same variable means are used in several cases. These common variables serve analogous functions in the two routines and will not be described again here.

This embodiment differs from the embodiment of Tables III and IV in that the counter is read and the counter reading is compensated at each interrupt. The compensated reading is then compared with a previously stored counter reading INSTIM. If the difference between these two readings is less than a preselected constant, SPD1, then the STATUS variable is incremented, WHLSPD is not updated, the new data flag is not set, and INSTIM is left unchanged.

When, at the next interrupt triggered by the transducer signal, the routine is entered the next time, the counter is again read, compensated, and compared with the value stored in INSTIM. This goes on until the difference exceeds the constant SPD1, at which time the counter difference is stored in WHLSPD, STATUS is stored in STAT1, STATUS is reset to 1, the current compensated counter reading is stored in INSTIM, and the data ready flag is set.

This alternate embodiment ensures that a preselected time resolution is achieved with each measurement interval, that is with each measurement of counter difference stored in WHLSPD. In the above example SPD1 is set to 1000 (hexadecimal), or 4096 decimal. This ensures that the time resolution is better than 0.015% for each time measurement. The desired minimum resolution can be readily obtained by setting SPD1 to the appropriate value. In general, it has been found that it is often preferable to ensure at least 1500 decimal clock pulses in each time interval measurement.

A further advantage of this embodiment is that it ensures that the time interval measurement is made promptly after the desired time resolution is achieved. This automatically permits maximum spatial resolution consistent with the desired time resolution. Thus, time resolution and response time are held nearly constant for a wide range of wheel speeds. The STAT1 variable provides the scaling information needed to properly correct the counter difference stored in WHLSPD to arrive at an accurate measure of the period of the signal generated by the transducer 10.

Second Preferred Embodiment

Figure 4:
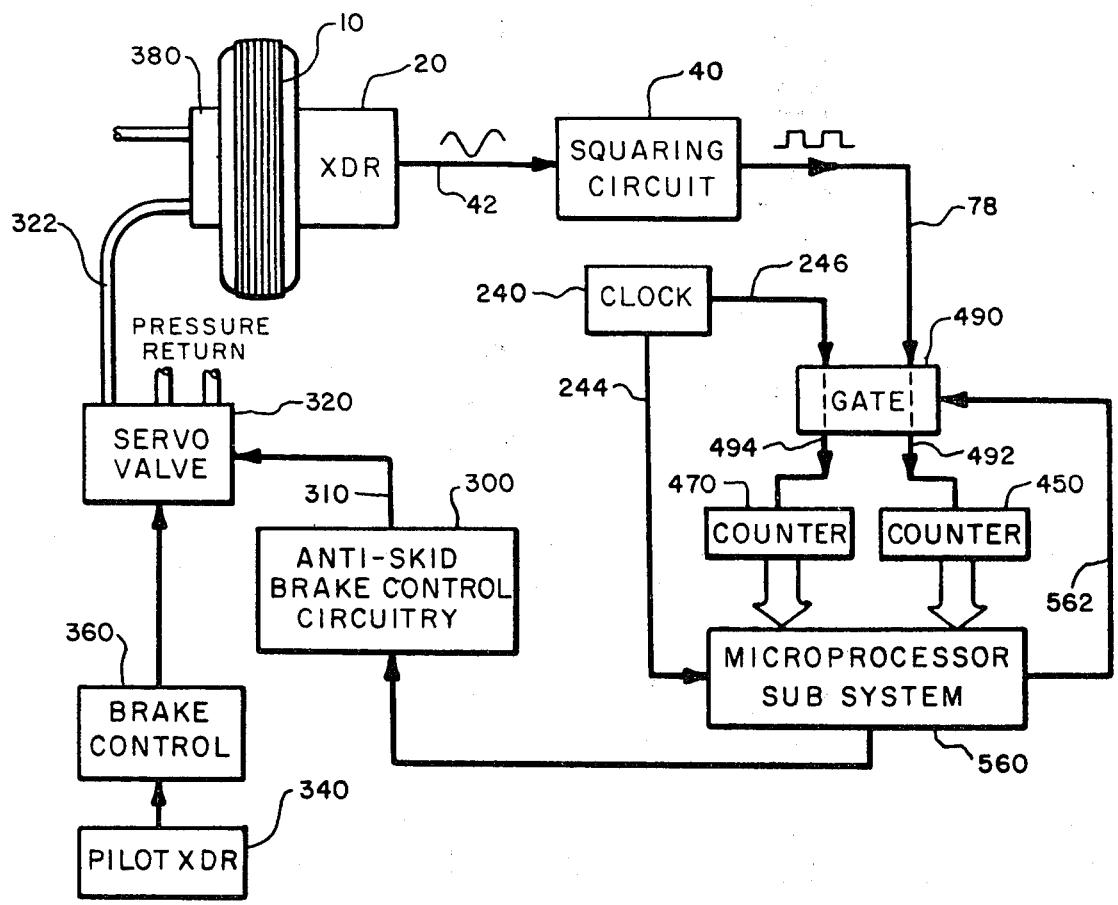
FIG. 4 is a block diagram of a brake control system including a second preferred embodiment of this invention.
Figure 5:
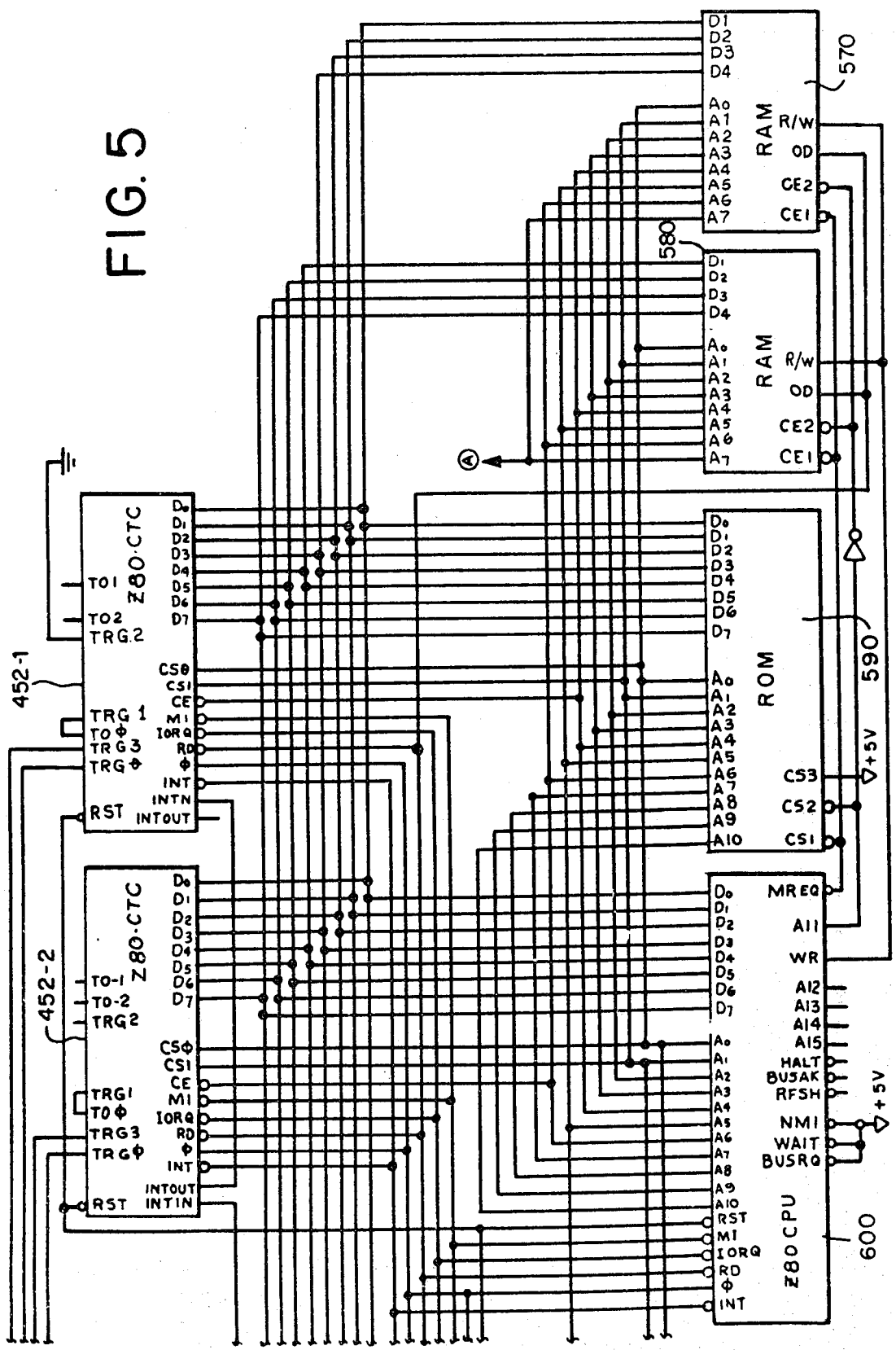
FIGS. 5 and 5a combine to form a schematic diagram of a portion of the embodiment of FIG. 4.
Figure 5A:
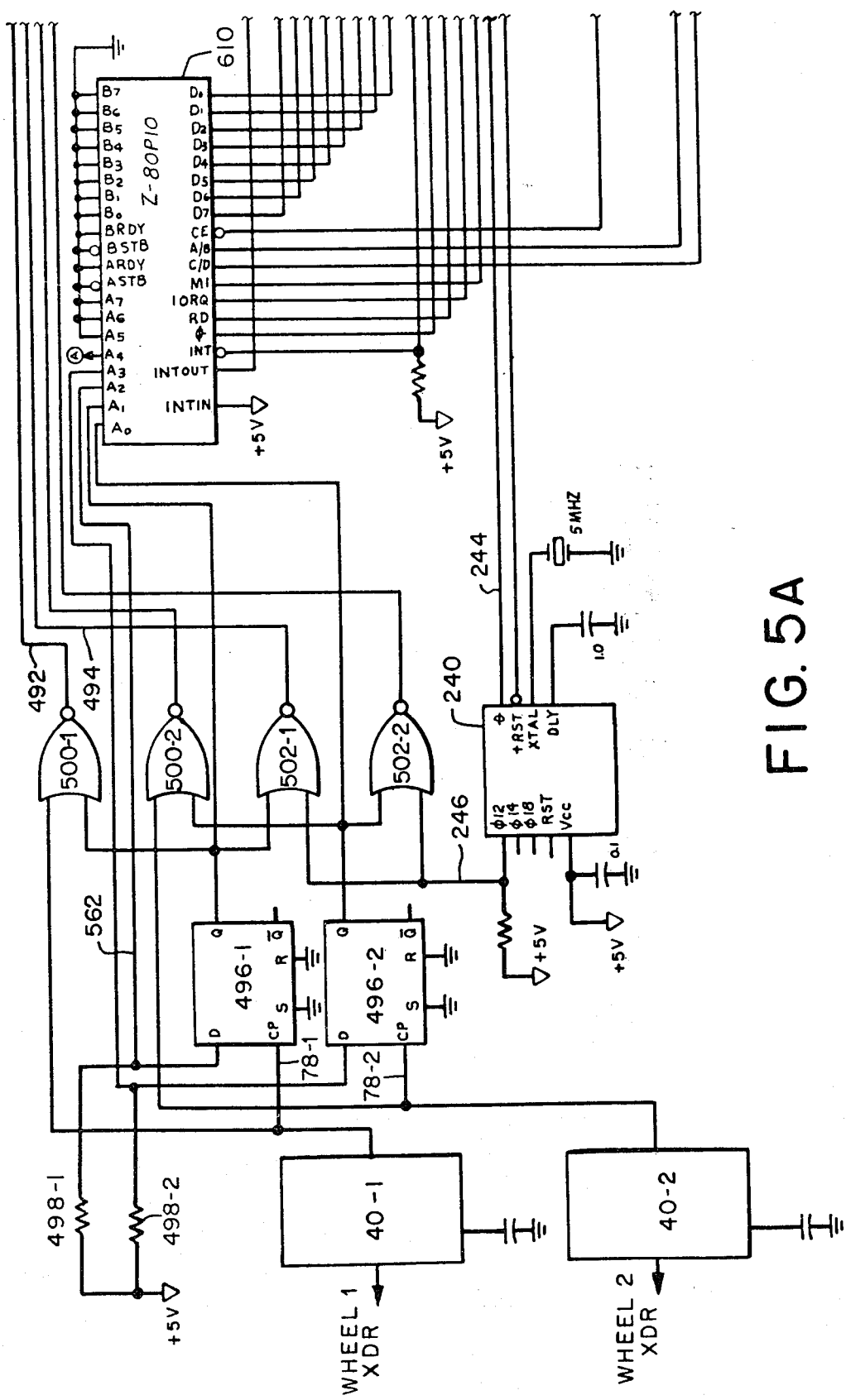

A second preferred embodiment is shown in FIGS. 4, 5 and 5a. This embodiment is also an antiskid braking system, but, as before, it should be understood that the novel features of this invention are also suited for use with other systems, such as automatic brake control systems. In the following description, elements common to both the first and second embodiments will be designated by the same reference number and will not be described in detail again. For example, the clock 240, the transducer 20, and the squaring circuit 40 are common to both embodiments, and reference should be made to the description of these elements in connection with the first embodiment for a detailed description of their structure and operation.

Referring now to FIG. 4, this second embodiment includes a braked wheel 10, a transducer 20, antiskid brake control circuitry 300, a servo valve 320, a pilot transducer 340, and a brake control 360, all as described above in connection with FIGS. 1 and 2.

In this embodiment, the sinusoidal signal on line 42 is applied to a squaring circuit 40 which generates a square wave signal on line 78 having a period equal to that of the sinusoidal output of the transducer 20. In the following description the sinusoidal output of the transducer 20 and the square wave signal will sometimes be referred to as wheel signals. The square wave signal is then applied to counter 450 via a gate 490. The counter 450 maintains a running count of the cycles of the square wave signal that are passed by the gate 490.

Similarly, a clock circuit 240 generates a periodic, regularly spaced clock signal on line 246. This clock signal is passed via the gate 490 to a second counter 470, which maintains a count of the cycles of the clock signal passed by the gate 490. In this embodiment counter 450 is an eight bit counter, and counter 470 is a sixteen bit counter.

A microprocessor subsystem 560 controls the gate 490 and is coupled to the counters 450,470 such that the microprocessor 560 can read the count stored in each of the counters 450,470. This microprocessor is timed by clock pulses generated by the clock 240 on line 244. As will be explained in detail below, the microprocessor is programmed to measure the period of the square wave signal by first reading the counters 450,470, then enabling the gate 490 for a period of time, and then reading the counters 450,470 a second time. By calculating the difference between the two sets of counter readings, a measure of the period of the square wave signal is obtained. The difference between the two readings of counter 450 corresponds to the number of cycles or periods of the square wave during the measurement period, and the difference between the two readings of the counter 470 corresponds to the number of cycles or periods of the clock signal during the measurement period. In this way the microprocessor controls the gate 490 and the counters 450,470 to measure the elapsed time for a known number of periods of the square wave signal.

The gate 490, though controlled by the microprocessor 560, is also responsive to the phase angle of the square wave signal on line 78 so that the counters 450,470 are always enabled and disabled at the same phase angle of the square wave signal. This ensures that the counter 470 is always enabled for a period which is precisely equal to a number of cycles of the square wave signal. This feature of the gate greatly relaxes time constraints on the microprocessor in accurately measuring the period of the square wave signal, and it improves the accuracy of the measurement, all as compared with the embodiment of FIG. 1.

For clarity, FIG. 4 shows microprocessor 560 as measuring the period of the wheel signal of a single wheel. FIGS. 5 and 5a show a slightly modified system which uses a single microprocessor 560 and a single clock 240 to measure the period of the wheel signals of two separate wheels. These two wheel signals will be referred to as "1" and "2" below. The two gates will correspondingly be referred to as 490-1 and 490-2, the two squaring circuits as 40-1 and 40-2, and the two sets of counters as 450-1, 450-2, 470-1 and 470-2. Proceeding now to a detailed description of this embodiment, the squaring circuits 40-1, 40-2, the gates 490-1,490-2, the counters 450-1,450-2, 470-1,470-2, and the microprocessor 560 are shown in FIGS. 5 and 5a. These component circuits will first be identified and briefly described, and then the interrelationship between the circuits, the miroprocessor program, and the operation of this embodiment will be described in detail. Because the structure of the circuits for processing the two wheel signals is identical, the following discussion of FIGS. 5 and 5a will for the most part only treat the one set of circuits for the signal from Wheel 1.

The gate 490-1 includes a Type D Flip-Flop 496-1 having the six conventional terminals. The set and reset terminals S and R are grounded, and the $\overline{Q}$ terminal is unused. The data input terminal D is connected both to the microprocessor subsystem 560 via conductor 562, and to a source of +5 volts via a 4.7 K ohm resistor 498-1. The clock input terminal CP is connected via line 78-1 to the output terminal of the squaring circuit 40-1. The output terminal Q of the flip-flop 496-1 carries a gating signal which is used to gate the two NOR gates 500-1 and 502-1.

Both NOR gates 500-1 and 502-1 have two input terminals, one of which is connected to the Q terminal of the flip-flop 496-1. The second input terminal of the NOR gate 500-1 is connected via line 78-1 to the output terminal of the squaring circuit 40-1. The second input terminal of the NOR gate 502-1 is connected via line 246 to the clock 240. When the gating signal on the Q terminal of the flip-flop 496-1 is in the Logic 0 state, the square wave signal on line 78-1 is passed by the gate 500-1 via line 492 to the counter 450-1. Similarly, when the gating signal is in the Logic 0 state, the clock signal on line 246 is passed by the gate 502-1 via the line 494 to the counter 470-1. However, when the gating signal is in the Logic 1 state, both gates 500-1,502-1 are disabled, and no further cycles of either the square wave signal or the clock signal reach the counters 450-1,470-1, respectively. Thus, according to the state of the gating signal on the Q terminal of the flip-flop 496-1, gates 500-1,502-1 are either enabled or disabled. When the gates 500-1,502-1 are disabled, the counters 450-1,470-1 are disabled as well, and in the following, the gate 490-1 will sometimes be referred to as means for disabling the counters 450-1,470-1.

In this preferred embodiment, flip-flop 496-1 is a CMOS 4013 D Type Flip-Flop, and gates 500-1,502-1 are CMOS 4001 NOR gates.

The counters 450-1,470-1 are both included in a Z80-CTC programmble counter circuit 452-1, as described above in connection with the first embodiment. When programmed and connected as described below, this Z80-CTC 452-1 is configured to form three separate counters: counter 450-1, counter 470-1, and a reference timing counter.

Counter 450-1 corresponds to Channel 3 of the Z80-CTC. It operates as an eight bit binary down counter which counts down from FF (hexadecimal) to zero and then automatically resets to FF. This counter 450-1 can count up to 256 cycles of the square wave signal before it recycles.

Counter 470-1 corresponds to Channels 0 and 1 of the Z80-CTC. These two channels are linked to form a sixteen bit binary down counter which counts down from FFFF (hexadecimal) to zero, and is then automatically reset to FFFF.

The third counter, the reference timing counter, corresponds to Channel 2 of the Z80-CTC. This reference timing counter operates in the timer mode. The counter divides the system clock by 256, and then counts down from 24 decimal. Each time the counter reaches zero, an interrupt is generated. In this embodiment, the system clock is a 2.50 megahertz signal, which results in an interrupt being generated at about 2.5 millisecond intervals. These interrupts are used to pace the execution of the microprocessor program, as will be explained below.

The control terminals of the Z80-CTC 452-1 are connected in the usual manner with $D_0$–$D_7$ connected to the data bus lines $D_0$–$D_7$ to enable the microprocessor 560 to read the contents of the counters 450-1,470-1 as necessary.

The microprocessor subsystem includes a Z80-CPU 600, two Random Access Memory Chips 570,580, a Read Only Memory chip 590 and a Z80-PIO chip 610. In this embodiment memory chips 570,580 each store 256 4 bit words and memory chip 590 stores 2,048 8 bit words. The Z80-CPU and the three memory chips are connected in the conventional manner, as shown, and the Z80-CPU is strobed by the clock 240 via line 244.

The Z80-PIO interface circuit, when programmed as described below, is configured with terminals $A_0$, $A_1$, $A_5$, $A_6$, and $A_7$ as input terminals; and terminals $A_2$, $A_3$, and $A_4$ as output terminals. The interrupt is disabled. As shown in the drawings, terminals $A_1$ and $A_0$ of the Z80-PIO are coupled to the Q terminals of flip-flops 496-1 and 496-2, respectively. Thus, the signal on terminal $A_1$ of the Z80-PIO indicates whether or not counters 450-1 and 470-1 are enabled, and the signal on terminal $A_0$ of the Z80-PIO indicates whether or not counters 450-2 and 470-2 are enabled.

Terminals $A_2$ and $A_3$ of the Z80-PIO are connected to the D inputs of flip-flops 496-1 and 496-2, respectively. When a Logic 0 signal is placed on $A_2$, flip-flop 496-1 will enable the gates 500-1 and 502-1 at the next positive going edge of the square wave signal on line 78-1. Similarly, when a Logic 1 signal is placed on $A_2$, flip-flop 496-1 will disable the gates 500-1 and 502-1 at the next positive going edge of the square wave signal on line 78-1. Thus, the timing of signals on terminal $A_2$ of the Z80-PIO is not critical to accurate measurement; the flip-flop 496-1 ensures that the gates 500-1, 502-1, and the counters 450-1,470-1 are consistently enabled and disabled at the same phase angle of the square wave signal on line 402-1.

Terminal $A_4$ of the Z80-PIO is coupled to address terminals $A_7$ of the two RAM chips 570,580 to provide hardware control over part of the addressing of these two RAM chips.

The Z80-CPU can be programmed to perform multiple tasks in measuring wheel speed and controlling brake pressure to control wheel skidding. The following discussion is limited to those programs which are important to an understanding of this invention. In general, these programs can be divided into three categories: the Port Setup Routine for configuring the Z80-PIO circuit and the two Z80-CTC circuits; the Period Measurement Routines for measuring the period of the wheel signal for the two wheels; and the Reference Timing Routine for pacing the execution of the Period Measurement Routines.

A program listing and a flow chart for the Port Setup Routine are presented in Tables VII and VIII, respectively. These tables present in comprehensive detail the operations needed to program the Z80-PIO and the two Z80-CTC circuits for use in this embodiment. Table XII presents a listing of the interrupt vectors, variables, and constants referenced in the Tables VI, IX, X, and XI.

Briefly stated, the Port Setup Routine programs the Z80-PIO to operate in Mode 3, with terminals $A_2$, $A_3$ and $A_4$ programmed as outputs and terminals $A_0$, $A_1$, $A_5$, $A_6$ and $A_7$ programmed as inputs. The Z80-PIO interrupt is disabled, and a safe interrupt address vector is loaded.

The Z80-CTC 452-1, containing counters 450-1 and 470-1 is programmed as follows: CTC0, the low byte of the counter 470-1, is configured to the counter mode, responsive to positive edges, with a time constant of 255, and the interrupt off; CTC1, the high byte of the counter 470-1, is configured to the counter mode, responsive to negative edges, with a time constant of 256 and the interrupt off; CTC2, the reference timing counter, is configured to the timer mode in which the system clock is divided by 256 before being counted, responsive to positive edges, with a time constant of 24 and the interrupt on: CTC3, the counter 450-1, is configured in the counter mode, responsive to positive edges, with a time constant of 256, and the interrupt off. By loading time constant of 255 in the low order byte, a continuous count is obtained. CTC0, CTC1, and CTC3 are loaded with safe interrupt address vectors, and CTC2 is loaded with an interrupt address vector which points to the entry point of the Reference Timing Routine. Counters CTC0, CTC1, and CTC3 of the Z80-CTC 452-2 are configured identically to the corresponding counters of the Z80-CTC 452-1. In the listings and flowcharts of Tables VII–XII, CTC0, CTC1, CTC2 and CTC3 refer to the four counters of Z80-CTC 452-1; and CTC4, CTC5, CTC6, and CTC7 refer to the four counters of Z80-CTC 452-2.

Table IX lists the very short Reference Timing Routine. This routine merely loads the constant DD (hexadecimal) into the variable COMMZ every time CTC6, the reference timing counter, decrements to zero and triggers an interrupt request. In operation, the reference timing routine sets COMMZ equal to DD at intervals of about 2.5 milliseconds.

Figure 6:
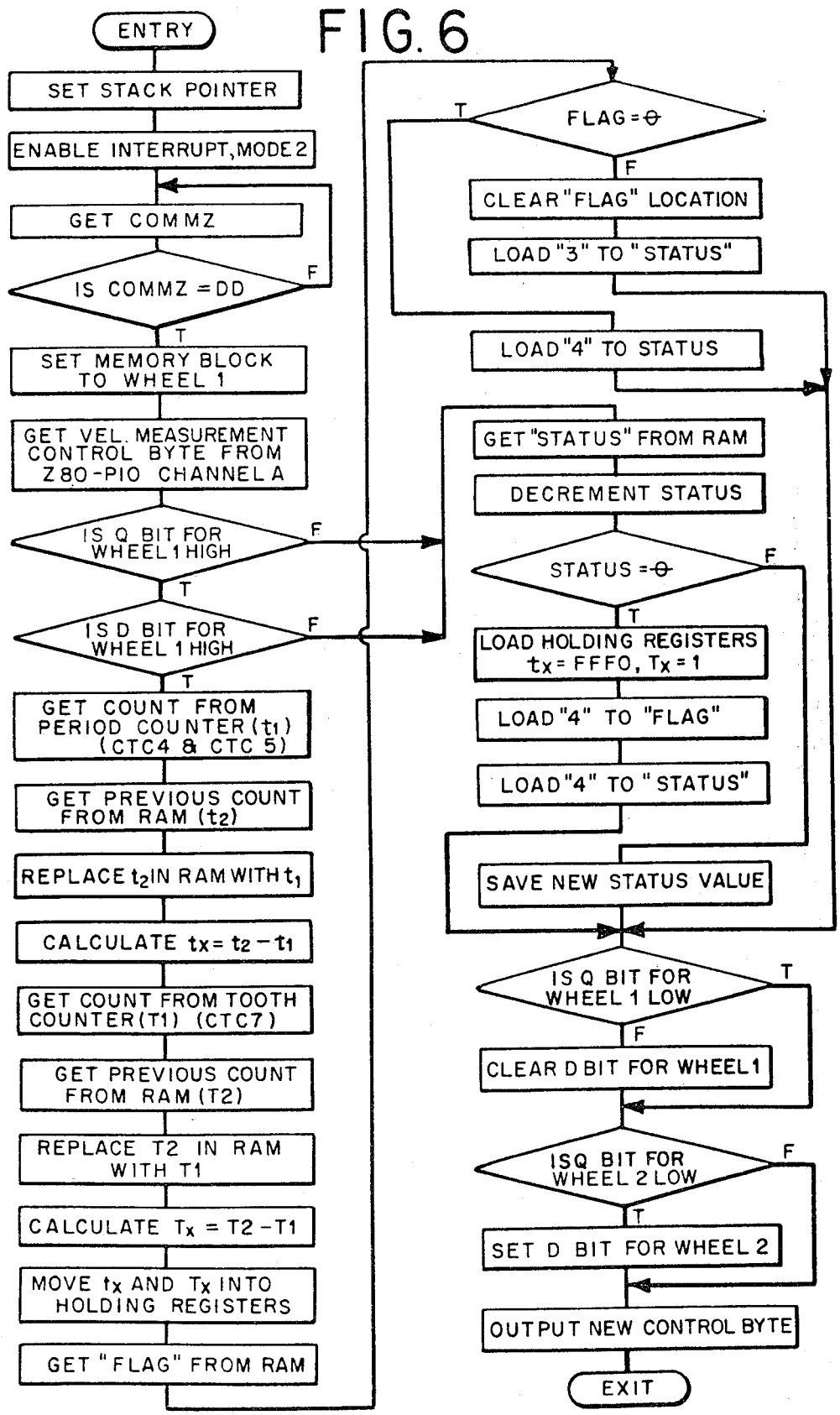

The Period Measurement Routine for Wheel 1 is listed in Table X and flowcharted in FIG. 6. This routine measures the period of the wheel signal of Wheel 1, and is executed on a regular basis as determined by the reference timing routine. In practice, the microprocessor is programmed to alternately measure the period of the wheel signal for Wheel 1 and the period of the wheel for Wheel 2. Two period measurement routines are provided, one for each wheel, and these two routines are executed alternately. The listing for the period measurement routine for Wheel 2 is listed in Table XI. The routines for the two wheels are almost identical, and a separate flowchart for the Period Measurement Routine for Wheel 2 has, therefore, not been provided.

The listings of Tables X and XI should be consulted for a detailed understanding of the Period Measurement Routines. In brief, the Period Measurement Routine for Wheel 1 first waits for COMMZ to be set equal to DD (hexadecimal). Once this condition is satisfied, terminal A4 of the Z80-PIO is loaded to set the RAM memory block to Wheel 1. Then the microprocessor tests the signals on the Q and D terminals of flip-flop 496-1 to determine whether the counters 450-1 and 470-1 have been disabled. If so, the counter 450-1 is read, subtracted from the previous reading of counter 450-1, and then the difference ($T_x$ in the flow chart) is stored in a holding register. Also, the current reading of the counter 450-1 is stored for use in the next pass. Similarly, the counter 470-1 is read, subtracted from the previous reading of counter 470-1, and then the difference ($t_x$ in the flow chart) is stored in a holding register. As above, the current reading of the counter 470-1 is stored for use in the next pass. The variable $T_x$, therefore, contains a count of the number of cycles of the wheel signal for wheel 1 over which the period measurement was taken, and the variable $t_x$ contains a count of the number of clock pulses occurring during the measurement. The period of the wheel signal is proportional to $t_x$ divided by $T_x$.

After $t_x$ and $T_x$ have been measured and stored, the routine checks the variable FLAG to determine whether $t_x$ and $T_x$ have been calculated properly. FLAG is set equal to 4 initially and again every time the counters 450-1,470-1 remain disabled for five consecutive passes through the routine. At these times, the stored count for counters 450-1 and 470-1 are not presumed to be accurate, and, therefore, the difference between the current readings and the stored counts may not be meaningful. Whenever the variable FLAG is not equal to zero, the routine sets another variable, STATUS, to indicate that $t_x$ and $T_x$ are not to be used in calculating wheel speed. Once the counters 450-1, 470-1 are found to be disabled and their counts are read and stored, the routine sets FLAG equal to zero once again to indicate that $T_x$ and $T_x$ will be accurate measures of wheel signal period when next calculated.

After $t_x$ and $T_x$ have been calculated and stored and FLAG has been checked, this routine then sets the signal on the D input of flip-flop 496-1 to zero if the Q output of flip-flop 496-1 is in the Logic 1 state. That is, the microprocessor causes the flip-flop 496-1 to enable to counters 450-1 and 470-1 at the next positive going edge of the square wave signal on line 78-1. Also, this routine sets the signal on the D input of flip-flop 496-2 to 1 if the Q output of flip-flop 496-1 is in the Logic 0 state. Setting the signal on the D input to Logic 1 causes the counters 450-2,470-2 to be disabled at the next positive-going edge of the square wave signal on line 78-2.

Every time the Period Measurement Routine for Wheel 1 is executed and counters 450-1 and 470-1 are found to be in the disabled state, the variable STATUS is decremented by one. STATUS is set equal to 4 after a successful calculation of $t_x$ and $T_x$, and the routine, therefore, allows 4 passes with the counters 450-1,470-1 enabled. If the counters remain disabled for five consecutive passes through the routine, this is taken as an indication that wheel speed is effectively zero. When this happens, FLAG is set to 4, thereby ensuring that the next pass through the routine will be treated as a first pass. Also $t_x$ is set to an appropriate value for zero wheel speed, $T_x$ is set to 1, and STATUS is set to 4 to indicate that a new measure of wheel period is available.

This routine provides three outputs: $t_x$, $T_x$ and STATUS. STATUS indicates whether new wheel signal period information is available for use by the antiskid system. Here, STATUS is set to 4 to indicate new information is available. $T_x$ indicates the number of cycles of the wheel signal that elapsed during the measurement period, and $t_x$ indicates the time that elapsed during the measurement period.

The Period Measurement Routine for Wheel 2 is almost identical to the routine for Wheel 1, except that the wheel designations are reversed. Thus, the routine for Wheel 1 starts the counters 450-1,470-1 for Wheel 1 and stops the counters 450-2,470-2 for Wheel 2. In a complementary fashion, the routine for Wheel 2 starts the counters 450-2, 470-2 for Wheel 2 and stops the counters 450-1,470-1 for Wheel 1.

The routines for Wheels 1 and 2 are excecuted alternately, and each routine waits until COMMZ is set equal to DD. Thus, one of the two routines is executed every 2.5 milliseconds, and a complete cycle of both routines is completed every 5.0 milliseconds. Any time spent waiting for COMMZ to be set to DD can be used to perform diagnostic routines to test the proper operation of the system.

In operation, each of the two sets of counters 450-1, 470-1 and 450-2, 470-2 is enabled for about 50 percent of the time. This embodiment provides extremely precise measurements of the period of the wheel signals. Computer interrupt requests are not used to define the measurement interval, and, therefore, variations in the response time of the microprocessor to an interrupt request do not affect the accuracy of the measurement. Instead, duration of the measurement interval is precisely and consistently set by the flip-flops 496-1, 496-2 at a predetermined phase angle of the respective wheel signal.

In addition to improved accuracy, this embodiment reduces the microprocessor execution time needed to measure the wheel signal period, thereby freeing up computer time for other tasks. Because the same phase angle of the wheel signal is used both to enable and to disable the counters, assymetries in the squaring circuit 40 or the transducer 20 which distort the waveform from a regular sine wave or square wave do not introduce inaccuracies. Thus, even if the square wave is not regular and spends more than 50 percent of the time in the Logic 1 state, an accurate measure of the period of the wheel signal is still made.

Of course, it should be understood that various changes and modifications to the preferred embodiments described herein will be apparent to those skilled in the art. For example, the counting means of the wheelspeed sensor of this invention may be hard wired as a single purpose digital circuit instead of using a programmable microprocessor. Furthermore, a single counting means may be multiplexed to measure the period of a number of wheel speed transducers. Such changes and modifications can be made without departing from the scope of the present invention and without diminishing its attendant advantages. It is, therefore, intended that such changes and modifications be covered by the following claims.

TABLE 1

; PORT SETUP ROUTINE PROGRAM LISTING

;
;
SETUP   IM 2; INTERRUPT MODE 2 (VECTOR)
;
;       PORT 1A
;
        LD A,OFFH; MODE 3 OPERATION
        OUT (DECCNT),A
        LD A,OFFH; INPUT BITS (ALL INPUT)
        OUT (DECCNT),A
        LD HL,VECT5; VECTOR FOR WHEEL SPEED
        SUBROUTINE
        LD A,L
        OUT (DECCNT),A
        LD A,OB7H: INTERRUPT CONTROL (ENABLE
;      INTERRUPTS, OR, HIGH, MASK FOLLOWS)
        OUT (DECCNT),A
        LD A,OFBH; INTERRUPT MASK (BIT 2
        SELECTED)
        OUT (DECCNT),A
;
;       PORT 1B
;

TABLE 1-continued

; PORT SETUP ROUTINE PROGRAM LISTING

LD A,OFFH; MODE 3 OPERATION
        OUT (ACTCNT),A
        LD A,OFFH; INPUT BITS (ALL INPUT)
        OUT (ACTCNT),A
        LD HL,VECT1; VECTOR FOR NO ROUTINE-
        RETURN
        LD A,L
        OUT (ACTCNT),A
        LD A,7H; INTERRUPT CONTROL (DISABLE
        INTERRUPTS)
        OUT (ACTCNT),A
;
;       PORT 2 (CTC)
;
        LD HL,VECT1
        LD A,L
        OUT (CTC0),A
        LD A,57H; CONTROL FOR CTC0
        OUT (CTC0),A
        LD A,O; TIME CONSTANT FOR CTC0 (256)
        OUT (CTC0),A
;
        LD A,55H; CONTROL FOR CTC1
        OUT (CTC1),A
        LD A,O: TIME CONSTANT (256)
        OUT (CTC1),A
;
        RETI
;
VECT1    DEFW RETNX
VECT5    DEFW WHEELSP
DECCNT  EQU 61H;
ACTCNT  EQU 63H;
CTC0     EQU 50H; CTC CIRCUIT, LOWEST BYTE
CTC1     EQU 51H; CTC CIRCUIT, 2 ND BYTE

TABLE II

PORT SETUP SUBROUTINE FLOW CHART

Start.
Set Interrupt Mode to 2.
Set Operating Mode Word of
Z80-PIO Channel A to 11111111 (Mode 3).
Set all port data bus lines of Z80-PIO
Channel A to inputs.
Set Interrupt Vector of Z80-PIO Channel A to
lower byte of the address of WHEELSP subroutine.
Set Interrupt Control Word of Z80-PIO
Channel A to 10110111 (Enable Interrupt, Logical OR,
High, Mask Follows).
Set mask of Z80-PIO Channel A to
11111011 (Only Bit 2 selected).
Set Operating Mode Word of Z80-PIO
Channel B to 11111111 (Mode 3).
Output 11111111 to set all port data bus
lines of Z80-PIO Channel B to inputs.
Set Interrupt Vector of Z80-PIO Channel B
to lower byte of a safe interrupt address.
Set Interrupt Control Word of Z80-PIO Channel
B to 00000111 (Disable Interrupt).
Set Interrupt Vector of Z80-CTC with safe interrupt
address.
Set Operating Mode of Channel 0 of
Z80-CTC to 01010111 (Disable interrupt, Counter
Mode, Positive Edge, Time Constant, Continue
counting after loading time constant).
Set Time Constant of Channel 0 of
Z80-CTC to 00000000 (256 decimal).
Set Operating Mode of Channel 1 of
Z80-CTC to 01010101 (Disable Interrupt, Counter
Mode, Positive Edge, Time Constant, Continue counting).
Set Time Constant of Channel 1 of
Z80-CTC to 00000000 (256 decimal).
Return.

TABLE III

WHEEL VELOCITY MEASUREMENT SUBROUTINE PROGRAM LISTING

```
;
; ENTRY HERE IS VIA VECTOR INTERRUPT, VELOCITY IS
; 16 BIT NUMBER.
; OPERATION: POSITIVE TRANSITION OF WHEEL XDCR
; CAUSES INTERRUPT AND THIS ROUTINE IS ENTERED.
; MOMENTARY COUNT IN THE CTC CIRCUIT (TWO BYTES)
; IS READ AND STORED IN "INSTIM" MEMORY, TWO BYTES.
; NEXT POSITIVE TRANSITION OF XDCR CAUSES ANOTHER ENTRY,
; COUNT IN CTC CIRCUIT IS READ IN, SUBSTRACTED FROM
; PREVIOUS COUNT IN "INSTIM" AND DIFFERENCE SAVED IN
; "WHLSPD" AS A VELOCITY INDICATION (TIME PERIOD AT THIS POINT).
; "COMMX" MEMORY IS SET TO ODDH TO INDICATE THAT NEW
; VELOCITY INFO IS AVAILABLE.
; "STATUS" IS USED AS A TEETH COUNTER. IF VALUE
; "TEETH" IS GREATER THAN 1, THIS COUNTER IS DECREMENTED
; ONCE FOR EACH INTERRUPT AND NEW VELOCITY INFO IS
; AVAILABLE ONLY WHEN "STATUS" IS ZERO. AT THIS TIME
; NEW VALUE OF "teeth" IS LOADED TO "STATUS".
;
WHEELSP   DI; DISABLE INTERRUPTS
          PUSH AF
          PUSH HL
          LD HL,STATUS
          DEC (HL)
          JR NZ,WHEELA
          PUSH DE
          PUSH BC
          LD C,CTCO
          IN A,(C); GET LOW BITS COUNT
          INC C
          IN D,(C); GET HIGH BITS COUNT
          SUB COMPEN; COMPENSATE FOR DELAY BETWEEN READINGS
          LD E,A; COMPENS VALUE IN DE
          LD A,TEETH; LOAD NEW TEETH COUNT
          LD (HL),A
          XOR A; CLEAR CARRY
          LD HL,(INSTIM)
          LD (INSTIM),DE: SAVE NEW TIME
          SBC HL,DE; GET DIFFERENCE (POS.,ABSOL. VALUE)
          LD (WHLSPD),HL
          LD A,ODDH
          LD (COMMX),A; NEW SPEED STATUS
          POP BC
          POP DE
WHEELA    POP HL
          POP AF
          EI
          RETI
;
;
; CONSTANTS
;
CTCO      EQU 50H; CTC CIRCUIT, LOWEST BYTE
COMMX     EQU 8; COMPENS FOR TIME BETWEEN READINGS OF
;               CTCO AND CTC1
TEETH     EQU 4; NUMBER OF TEETH PER MEASUREMENT
;
; MEMORY ASSIGNMENTS
;
WHLSPD    EQU 80BH; COMBINED, FILTERED SPEED (TWO BYTES)
STATUS    EQU 812H; STATUS FOR VEL CONVERT (TWO BYTES)
INSTIM    EQU 814H; FORMER COUNTER VALUE (TWO BYTES)
```

TABLE IV

WHEEL VELOCITY MEASUREMENT SUBROUTINE FLOW CHART

Start.
Disable Interrupts.
Store AF and HL in Stack.
Decrement "STATUS" and if "STATUS" is not equal to zero, go to EXIT.
Store DE and BC in Stack.
Read low and high byte of counter (CTC0 and CTC1)
Subtract constant from reading to compensate for delay between reading the two bytes.
Set "STATUS" equal to "TEETH".
Load previous counter reading (2 bytes) into temporary register.
Store compensated current counter reading.
Get the absolute value of the difference between the current and previous counter reading.
Store the counter difference.
Set flag indicating new counter difference available.
Restore BC and De from Stack.

TABLE IV-continued

WHEEL VELOCITY MEASUREMENT SUBROUTINE FLOW CHART

EXIT   Restore HL and AF from Stack.
        Enable Interrupts.
        Return.

TABLE V

ALTERNATE WHEEL VELOCITY MEASUREMENT SUBROUTINE PROGRAM LISTING

```
; ENTRY HERE IS VIA VECTOR INTERRUPT. VELOCITY IS
; 16 BIT NUMBER.
; OPERATION: POSITIVE TRANSITION OF WHEEL XDCR
; CAUSES INTERRUPT AND THIS ROUTINE IS ENTERED.
; MOMENTARY COUNT IN THE CTC CIRCUIT (TWO
; BYTES) IS READ AND STORED IN "INSTIM"
; MEMORY, TWO BYTES. NEXT POSITIVE TRANS-
; TION OF XDCR CAUSES ANOTHER ENTRY, COUNT
; IN CTC CIRCUIT IS READ IN, SUBTRACTED FROM
; PREVIOUS COUNT IN "INSTIM" and DIFFERENCE
; COMPARED WITH MINIMUM VALUE TO OBTAIN
; GOOD RESOLUTION. IF VALUE IS TOO LOW,
; TOOTH COUNT IS INCREMENTED AND EXIT MADE
; WITHOUT NEW VELOCITY INFO. WHEN VALUE IS
; ABOVE THE MINIMUM, THE TOTAL DIFFERENCE
; IS USED TO CALCULATE VELOCITY ALONG WITH
; VALUE IN THE TOOTH COUNTER, WHICH IS THEN
; RESET FOR NEW MEASUREMENT.
; "COMMX" MEMORY IS SET TO 0DDH TO INDICATE
; THAT NEW VELOCITY INFO IS AVAILABLE.
; "STATUS" IS USED AS A TOOTH COUNTER.
;
WHEELSP    DI; DISABLE INTERRUPTS
           PUSH AF
           PUSH HL
           PUSH DE
           PUSH BC
           LD C,CTCO
           IN A,(C); LOW BYTE
           INC C
           IN D,(C); HIGH BYTE
           SUB COMPEN
           LD E,A
           PUSH DE
           LD HL,(INSTIM)
           AND A; CLEAR CARRY
           SBC HL,DE; GET DIFFERENCE
           EX DE,HL; TIME INTO DE
           LD HL,SPD1; FIRST SCALE
           AND A
           SBC HL,DE
           LD HL,STATUS
           JR C,WHEELA; TIME ABOVE MINIMUM
           INC (HL); INCREMENT TOOTH COUNT
           POP DE; BALANCE STACK
           JR WHEELB
WHEELA     LD A,(HL); GET TOOTH COUNT
           LD (STAT1),A; AND SAVE AS SCALE
           LD (HL),1; NEW TOOTH COUNTER
           LD (WHLSPD),DE; SAVE NEW SPEED
           POP HL; GET NEW COUNT
           LD (INSTIM),HL: SAVE
           LD A,0DDH; SPEED STATUS
           LD (COMMX),A
WHEELB     POP BC
           POP DE
           POP HL
           POP AF
           EI
           RETI
;
; CONSTANTS
;
CTCO       EQU 50H; CTC CIRCUIT, LOWEST BYTE
COMPEN     EQU 8; COMPENS FOR TIME BETWEEN
;          READINGS OF CTCO AND CTC1
SPD1       EQU 1000H; SPEED SCALE
```

TABLE V-continued

ALTERNATE WHEEL VELOCITY MEASUREMENT SUBROUTINE PROGRAM LISTING

; MEMORY ASSIGNMENTS

| | | |
|---|---|---|
| WHLSPD | EQU 80BH; | COMBINED, FILTERED SPEED (TWO BYTES) |
| STATUS | EQU 812H; | STATUS FOR VEL CONVERT (TWO BYTES) |
| INSTIM | EQU 814H; | FORMER COUNTER VALUE (TWO BYTES) |
| STAT1 | EQU 828H; | TEMPORARY STORAGE FOR TOOTH COUNT |
| COMMX | EQU 825H; | STATUS OF WHEEL SPEED |

TABLE VI

ALTERNATE WHEEL VELOCITY MEASUREMENT SUBROUTINE FLOW CHART

Start.
Disable Interrupts.
Store AF, HL, DE, BC in Stack.
Read low and high byte of counter to obtain current counter reading (CTCO and CTC1).
Subtract constant from counter reading to compensate for delay between reading the bytes.
Store compensated counter reading in Stack.
Subtract compensated counter reading from previous reading to obtain current counter difference.
Compare current counter difference with preset minimum difference; if current counter difference is less than preset minimum difference, then increment tooth count, restore DE from stack and go to WHEELB.
If current difference is greater than preset minimum difference, then store tooth count as scale factor, set tooth count equal to 1, save current counter difference and compensated counter reading and set flag indicating new counter difference available.

WHEELB   Restore BC, DE, HL, AF from Stack.
              Enable interrupts.
              Return.

TABLE VII

PORT SETUP ROUTINE LISTING

[ PORT SETUP ]

; Z80-PIO - CHANNEL A (WHEEL SPEED)

```
LD A, 0FFH;           MODE 3 OPERATION
OUT (WSPDCN),A
LD A, 0E3H;           INPUT BITS
OUT (WSPDCN),A
LD HL,VECT0;          NO ROUTINE-RETURN
LD A,L
OUT (WSPDCN),A
LD A,7;               INTERR CONTROL
                      (DISABLE INTERRUPTS)
OUT (WSPDCN),A
```

; Z80-PIO - CHANNEL B

```
LD A, 0FFH;           MODE 3
OUT (DITSCN),A
LD A, 0FFH;           ALL INPUT
OUT (DITSCN),A
LD HL, VECT0;         NO ROUTINE RETURN
LD A,L
```

TABLE VII-continued
PORT SETUP ROUTINE LISTING

```
        OUT (DITSCN),A
        LD A, 7;           DISABLE INTERRUPT
        OUT (DITSCN),A
;
;
;       CTC0 (WHEEL 2 TC, LOW BYTE); (Z80-CTC#1)

LD HL,VECT0
        LD A,L
        OUT (CTC0),A
        LD A,55H;          CONTROL
        OUT (CTC0),A
        LD A,0FFH;         TC= 256
        OUT (CTC0),A
;       CTC1 (WHEEL 2 TC, HIGH BYTE)
;
        LD A,45H;          CONTROL
        OUT (CTC1),A
        LD A,0;            TC= 256
        OUT (CTC1),A
;
;       CTC2 (TEST CARD COMMUNICATION)

LD A,55H
        OUT (CTC2),A
        LD A,0
        OUT (CTC2),A
;
;       CTC3 (WHEEL 2 WHEEL SIGNAL CYCLE COUNTER)

LD A,55H
        OUT (CTC3),A
        LD A,0
        OUT (CTC3),A
;
;       CTC4 (WHEEL 1 TC, LOW BYTE) (Z80-CTC#2)

LD HL,VECT4
        LD A,L
        OUT (CTC4),A
        LD A,55H
        OUT (CTC4),A
        LD A,0FFH
        OUT (CTC4),A
;
;       CTC5 (WHEEL 1 TC, HIGH BYTE)

LD A,45H
        OUT (CTC5),A
        LD A,0
        OUT (CTC5),A
;
;       CTC6 (REFERENCE TIMING, BOTH WHEELS)

LD A,0B5H;         TIMER MODE, DIVIDED BY 256
        OUT (CTC6),A
        LD A,18H;          TIME CONSTANT = 24 DECIMAL
        OUT (CTC6),A
;
;       CTC7 (WHEEL 1 WHEEL SIGNAL CYCLE COUNTER)

LD A,55H
        OUT (CTC7),A
        LD A,0
        OUT (CTC7),A
;
```

TABLE VIII
PORT SETUP ROUTINE FLOW CHART

Entry
Set Operating Mode Word of Z80-PIO
Channel A to 11111111 (Mode 3).
Set port data bus lines $A_0, A_1, A_5, A_6, A_7$, to inputs and
port data bus lines $A_2, A_3, A_4$ to outputs.
Set Interrupt Vector of Z80-PIO Channel A to safe address.
Disable interrupt of Z80-PIO Channel A.
Set Operating Mode Word of Z80-PIO Channel B to
11111111 (Mode 3).
Set all port data bus lines of Z80-PIO Channel B to inputs.
Set Interrupt Vector of Z80-PIO Channel B to safe address.
Disable Interrupt of Z80-PIO Channel B.
Set Interrupt Vectors of CTC0-CTC3 to safe addresses.
Set Operating Mode word of CTC0 to 55H.
Set Time Constant of CTC0 to 255 decimal.
Set Operating Mode Word of CTC1 to 45H.
Set Time Constant of CTC1 to 256 decimal.
Set Operating Mode Word of CTC2 to 55H.
Set Time Constant of CTC2 to 256 decimal.
Set Operating Mode Word of CTC3 to 55H.
Set Time Constant of CTC3 to 256 decimal.
Set Interrupt Vectors of CTC4, CTC5, and CTC7 to safe address;
set Interrupt Vector of CTC6 to address of Reference Timing
Routine.
Set Operating Mode Word of CTC4 to 55H.
Set Time Constant of CTC4 to 255 decimal.
Set Operating Mode Word of CTC5 to 45H.
Set Time Constant of CTC5 to 256 decimal.
Set Operating Mode Word of CTC6 to B5H.
Set Time Constant of CTC6 to 24 decimal.
Set Operating Mode Word of CTC7 to 55H.
Set Time Constant of CTC7 to 256 decimal.
Exit.

TABLE IX
REFERENCE TIMING ROUTINE LISTING

```
;
;       ┌─────────────────────┐
;       │  REFERENCE TIMING   │
;       └─────────────────────┘
;
;
REFUPX  LD (IY+COMMZ-RAM),0DDH;
                OPEN GATE FOR NEW LOOP
        EI
        RETI; RETURN FROM INTERRUPT
;
;       BLANK RETURN

RETNX   NOP
        NOP
        RETI
;
```

TABLE X
PERIOD MEASUREMENT ROUTINE FOR WHEEL 1

```
;
;       ┌─────────┐
;       │ WHEEL 1 │
;       └─────────┘
;
MAIN1X  LD SP,STACK
        LD IY,RAM
        IM 2
        EI
        LD HL,COMMZ
        LD A,(HL)
        CP 0DDH;           TEST GATE
        JR NZ,MAIN1X
        LD (HL),0;         CLEAR GATE
;
        IN A,(WSPD)
```

TABLE X-continued
PERIOD MEASUREMENT ROUTINE FOR WHEEL 1

```
          RES WHEEL,A
          OUT (WSPD),A;  SET MEMORY BLOCK TO
                         WHEEL 1
;
;         PERIOD MEASUREMENT
;
;

PUSH AF
          BIT WHL1Q,A
          JR Z,WHEL1A; COUNT DID NOT STOP YET
          BIT WHL1D,A
          JR Z,WHEL1A; COUNTER DID NOT START
                      YET
          IN A,(CTC4); LOW BYTE OF COUNT
          LD E,A
          IN A,(CTC5); HIGH BYTE OF COUNT
          LD D,A
          LD HL,(OLDPER); GET OLD COUNT
          LD (OLDPER),DE; SAVE NEW COUNT
          XOR A;  OVERFLOW IF EQUAL
          SBC HL,DE
          IN A, (CTC7); GET CYCLE COUNT
          LD E,A
          LD A,(OLDTOT)
          SUB E
          LD B,A
          LD A,E
          LD (OLDTOT),A
          LD A,(FLAG)
          CP 0; CHECK IF VALID
          LD A,04
          JR Z,WHEL1B; JUMP IF VALID
          XOR A
          LD (FLAG),A; NEXT SAMPLE WILL BE
                      VALID
          LD A,3; BUT DONT CALCULATE THIS ONE
          JR WHEL1B
WHEL1A    LD A,(STATUS)
          DEC A
          JR NZ,WHEL1B
          LD HL,0FFF0H
          LD B,1
          LD A,04; NEXT IS INVALID
          LD (FLAG),A
WHEL1B    LD (STATUS),A
          POP AF
          BIT WHL1Q,A
          JR Z,WHEL1C
          RES WHL1D,A
WHEL1C    BIT WHL2Q,A
          JR NZ,WHEL1D
          SET WHL2D,A
WHEL1D    OUT (WSPD),A
;
```

TABLE IX
PERIOD MEASUREMENT ROUTINE FOR WHEEL 2

```
;
;         [WHEEL 2]
;
;
;
;
MAIN2X    LD SP,STACK
          IM 2
          EI
          LD HL,COMMZ
          LD A,(HL)
          CP 0DDH;       TEST GATE
          JR NZ,MAIN2X
          LD (HL),0;     CLEAR GATE
;
          IN A,(WSPD)
          SET WHEEL,,A
          OUT (WSPD),A;  SET MEMORY BLOCK TO
                         WHEEL 2
;
```

TABLE IX-continued
PERIOD MEASUREMENT ROUTINE FOR WHEEL 2

```
;         PERIOD MEASUREMENT
;
;

PUSH AF
          BIT WHL2Q,A
          JR Z,WHEL2A; COUNT DID NOT STOP YET
          BIT WHL2D,A
          JR Z,WHEL2A; COUNTER DID NOT START
                      YET
          IN A,(CTC0); LOW BYTE OF COUNT
          LD E,A
          IN A,(CTC1); HIGH BYTE OF COUNT
          LD D,A
          LD HL,(OLDPER); GET OLD COUNT
          LD (OLDPER),DE; SAVE NEW COUNT
          XOR A;  OVERFLOW IF EQUAL
          SBC HL,DE
          IN A,(CTC3);   GET CYCLE COUNT
          LD E,A
          LD A,(OLDTOT)
          SUB E
          LD B,A
          LD A,E
          LD (OLDTOT),A
          LD A,(FLAG)
          CP 0; CHECK IF VALID
          LD A,04
          JR Z,WHEL2B; JUMP IF VALID
          XOR A
          LD (FLAG),A; NEXT SAMPLE WILL BE
                      VALID
          LD A,3; BUT DONT CALCULATE THIS ONE
          JR WHEL2B
WHEL2A    LD A,(STATUS)
          DEC A
          JR NZ,WHEL2B
          LD HL,0FFF0H
          LD B,1
          LD A,04; NEXT IS INVALID
          LD (FLAG),A
WHEL2B    LD (STATUS),A
          POP AF
          BIT WHL2Q,A
          JR Z,WHEL2C
          RES WHL2D,A
WHEL2C    BIT WHL1Q,A
          JR NZ,WHEL2D
          SET WHL1D,A
WHEL2D    OUT (WSPD),A
;
```

TABLE XII
INTERRUPT VECTORS, VARIABLES AND CONSTANTS

```
;
;         [VECTOR TABLE]
;
;
;
VECT0     WORD RETNX; BLANK RETURN
VECT1     WORD RETNX
VECT2     WORD RETNX
VECT3     WORD RETNX
VECT4     WORD RETNX
VECT5     WORD RETNX
VECT6     WORD REFUPX; REFERENCE ROUTINE
VECT7     WORD RETNX
;

[RAM]
;
;
RAM       EQU 800H; BEGINNING OF RAM
```

TABLE XII-continued
INTERRUPT VECTORS, VARIABLES AND CONSTANTS

| | |
|---|---|
| STACK | EQU 87FH; END OF RAM (RETURN STACK) |
| OLDPER | EQU 803H; OLD TIME PERIOD COUNT |
| OLDTOT | EQU 805H; OLD CYCLE COUNT |
| STATUS | EQU 806H; STATUS OF PERIOD MEASUREMENT |
| COMMZ | EQU 81AH; STATUS OF REFERENCE (TIMING GATE) |
| FLAG | EQU 814H; FLAG FOR PERIOD VALIDITY |
| ; | |
| ; | |
| ; | |
| ; | |
| ; | PORTS |
| ; | |
| ; | |
| ; | |
| CTC0 | EQU 0BCH; CTC CIRCUIT, LOWEST BYTE |
| CTC1 | EQU 0BDH; CTC CIRCUIT, 2ND BYTE |
| CTC2 | EQU 0BEH; CTC CIRCUIT, 3RD BYTE |
| CTC3 | EQU 0BFH; CTC CIRCUIT, 4TH BYTE |
| CTC4 | EQU 0ECH; CTC CIRCUIT, LOWEST BYTE |
| CTC5 | EQU 0EDH; CTC CIRCUIT, 2ND BYTE |
| CTC6 | EQU 0EEH; CTC CIRCUIT, 3RD BYTE |
| CTC7 | EQU 0EFH; CTC CIRCUIT, 4TH BYTE |
| WSPD | EQU 0DCH; WHEEL SPEED CONTROL |
| WSPDCN | EQU 0DDH; |
| | DITS EQU DEH |
| DITSCN | EQU 0DFH |
| WHL1D | EQU 2; "D" BIT CONTROL OUTPUT FOR WHEEL 1 |
| WHL2D | EQU 3; "D" BIT CONTROL OUTPUT FOR WHEEL 2 |
| WHL1Q | EQU 1; "Q" BIT INPUT FOR WHEEL 1 |
| WHL2Q | EQU 0; "Q" BIT INPUT FOR WHEEL 2 |
| WHEEL | EQU 4; RAM BLOCK ALLOCATION (0 = WHEEL 1, 1 = WHEEL 2) |

I claim:

1. In a brake control system including a rotatable wheel and means, responsive to the wheel, for generating a periodic wheel signal having a frequency indicative of the rotational behavior of the wheel, an apparatus for precisely measuring the time duration of one or more cycles of the wheel signal comprising:
   clock means for generating a periodic clock signal;
   first counter means for maintaining a count indicative of clock signal cycles;
   second counter means for maintaining a count indicative of wheel signal cycles;
   gating means for selectively enabling and disabling the first and second counter means, said gating means responsive to the phase of the wheel signal such that the first counter means is consistently enabled and disabled at substantially the same phase angle of the wheel signal;
   computer means for controlling the gating means first to enable the first and second counter means and then, after a period of time, to disable the first and second counter means;
   means, included in the computer means, for determining whether the first and second counter means have been disabled; and
   means, included in the computer means, for reading and storing the counts stored in the first and second counter means after the determining means has determined that the first and second counter means have been disabled.

2. The invention of claim 1 wherein the gating means comprises:
   a flip-flop having a data input terminal coupled to an output port of the computer means, a clock input terminal coupled to the wheel signal generating means, and an output terminal, said flip-flop operating to generate a gating signal on the output terminal;
   a first gate having an input terminal coupled to the clock means, an output terminal coupled to the first counter means, and a gating terminal coupled to the output terminal of the flip-flop, said first gate operating to selectively gate the clock signal in response to the gating signal generating by the flip-flop;
   a second gate having an input terminal coupled to the wheel signal generating means, an output terminal coupled to the second counter means, and a gating terminal coupled to the output terminal of the flip-flop, said second gate operating to selectively gate the wheel signal in response to the gating signal generated by the flip-flop.

3. The invention of claim 1 wherein the computer means further comprises:
   means for reading and storing the counts stored in the first and second counter means before the first and second counter means are enabled; and
   means for calculating and storing the difference between the before and after counts stored in the first counter means and the difference between the before and after counts stored in the second counter means.

4. In a brake control system including a rotatable wheel and means, responsive to the wheel, for generating a periodic wheel signal having a frequency indicative of the rotational behavior of the wheel, an apparatus for precisely measuring the time duration of one or more cycles of the wheel signal comprising:
   clock means for generating a periodic clock signal;
   first counter means for maintaining a count indicative of clock signal cycles;
   second counter means for maintaining a count indicative of wheel signal cycles;
   gating means for selectively enabling and disabling the first and second counter means, said gating means responsive both to a control signal and to the phase angle of the wheel signal, such that, when the control signal is in a first state, the first and second counter means are consistently enabled at a predetermined phase angle of the wheel signal and, when the control signal is in a second state, the first and second counter means are consistently disabled at the same predetermined phase angle of the wheel signal;
   computer means, coupled to the first and second counter means and to the gating means, for generating the control signal to selectively control the gating means;
   means, included in the computer means, for reading and storing the counts stored in the first and second counter means at a first time;
   means, included in the computer means, for placing the control signal in the first state at a second time, subsequent to the first time, to cause the gating means to enable the first and second counter means at the next occurrence of the predetermined phase angle of the wheel signal;

means, included in the computer means, for placing the control signal in the second state at a third time, subsequent to the second time, to cause the gating means to disable the first and second counter means at the next occurrence of the predetermined phase angle of the wheel signal;

means, included in the computer means, for determining whether the first and second counter means have been disabled;

means, included in the computer means, for reading and storing the counts stored in the first and second counter means at a fourth time, subsequent to the third time and after the determining means has determined that the first and second counter means have been disabled;

means, included in the computer means, for calculating the difference between the count stored in the first counter means at the first and fourth times as a measure of elapsed time; and means, included in the computer means, for calculating the difference between the count stored in the second counter means at the first and fourth times as a measure of the number of wheel signal cycles occurring during the elapsed time.

5. The invention of claim 4 wherein the gating means comprises:

a flip-flop having a data input terminal coupled to the computer means for receiving the control signal, a clock input terminal coupled to the wheel signal generating means, and an output terminal, said flip-flop operating to generate a gating signal on the output terminal;

a first gate having an input terminal coupled to the clock means, an output terminal coupled to the first counter means, and a gating terminal coupled to the output terminal of the flip-flop, said first gate operating to selectively gate the clock signal in response to the gating signal generated by the flip-flop;

a second gate having an input terminal coupled to the wheel signal generating means, an output terminal coupled to the second counter means, and a gating terminal coupled to the output terminal of the flip-flop, said second gate operative to selectively gate the wheel signal in response to the gating signal generated by the flip-flop.

6. The invention of claim 2 wherein the determining means comprises:

means for applying the gating signal to the computer means; and means, included in the computer means, for sensing the gating signal to determine whether the first and second counter means have been disabled.

7. The invention of claim 5 wherein the determining means comprises:

means for applying the gating signal to the computer means; and means, included in the computer means, for sensing the gating signal to determine whether the first and second counter means have been disabled.

8. In a brake control system including a rotatable wheel and means, responsive to the wheel, for generating a periodic wheel signal having a frequency indicative of the rotational behavior of the wheel, an apparatus for precisely measuring the time duration of one or more cycles of the wheel signal comprising:

clock means for generating a periodic clock signal;

first counter means for maintaining a count indicative of clock signal cycles;

second counter means for maintaining a count indicative of wheel signal cycles;

gating means for selectively enabling and disabling the first counter means, said gating means responsive to the phase of the wheel signal such that the first counter means is consistently enabled and disabled at substantially the same phase angle of the wheel signal;

computer means for controlling the gating means first to enable the first counter means and then, after a period of time, to disable the first counter means;

means, included in the computer means, for determining whether the first counter means has been disabled; and means, included in the computer means, for reading and storing the counts stored in the first and second counter means after the first counter means has been disabled.

9. The invention of claim 8 wherein the gating means comprises:

a flip-flop having a data input terminal coupled to an output port of the computer means, a clock input terminal coupled to the wheel signal generating means, and an output terminal, said flip-flop operating to generate a gating signal on the output terminal;

a first gate having an input terminal coupled to the clock means, an output terminal coupled to the first counter means, and a gating terminal coupled to the output terminal of the flip-flop, said first gate operating to selectively gate the clock signal in response to the gating signal generated by the flip-flop;

a second gate having an input terminal coupled to the wheel signal generating means, an output terminal coupled to the second counter means, and a gating terminal coupled to the output terminal of the flip-flop, said second gate operating to selectively gate the wheel signal in response to the gating signal generated by the flip-flop.

10. The invention of claim 9 wherein the determining means comprises:

means for applying the gating signal to the computer means; and means, included in the computer means, for sensing the gating signal to determine whether the first and second counter means have been disabled.

* * * * *

UNITED STATES PATENT AND TRADEMARK OFFICE
CERTIFICATE OF CORRECTION

PATENT NO. : 4,409,664
DATED : October 11, 1983
INVENTOR(S) : Skarvada, Thomas

Page 1 of 2

It is certified that error appears in the above-identified patent and that said Letters Patent is hereby corrected as shown below:

Column 6, line 48, please delete "(TRG½)" and substitute therefor --(TRGθ)--;

Column 9, line 3, please delete "means" and substitute therefor --names--;

Column 12, line 64, please delete "VI" and substitute therefor --VII--;

Column 17, Table III, approximately line 37, please delete "LD (INSTIM),DE: SAVE NEW TIME" and substitute therefor --LD (INSTIM),DE; SAVE NEW TIME--;

Column 17, Table III, approximately line 56, please delete
"INSTIM     EQU 814H: FORMER COUNTER VALUE (TWO BYTES)" and substitute therefor
--INSTIM     EQU 814H; FORMER COUNTER VALUE (TWO BYTES)--;

Column 18, Table IV-continued, line 69, please delete "De" and substitute therefor --DE--;

UNITED STATES PATENT AND TRADEMARK OFFICE
CERTIFICATE OF CORRECTION

PATENT NO. : 4,409,664
DATED : October 11, 1983
INVENTOR(S) : Skarvada, Thomas

It is certified that error appears in the above-identified patent and that said Letters Patent is hereby corrected as shown below:

Column 19, Table V, line 56, please delete "LD (INSTIM),HL: SAVE" and substitute therefor --LD (INSTIM), HL; SAVE--;

Column 20, Table V-continued, lines 14 to 17, please delete "COMMX EQU
    825H; STATUS
    OF WHEEL
    SPEED" and substitute therefor
--COMMX     EQU 825H; STATUS OF WHEEL SPEED--;

Column 23, on the Table labeled Table IX, line 50, please delete "TABLE IX" and substitute therefor --TABLE XI--;

Column 24, on the Table labeled Table IX-continued, line 1, please delete "TABLE IX-continued" and substitute therefor --TABLE XI-continued--;

Signed and Sealed this

Sixth Day of August 1985

[SEAL]

Attest:

DONALD J. QUIGG

Attesting Officer    Acting Commissioner of Patents and Trademarks